United States Patent
Ikarashi et al.

(10) Patent No.: US 11,250,004 B2
(45) Date of Patent: Feb. 15, 2022

(54) SECURE EQUIJOIN SYSTEM, SECURE EQUIJOIN DEVICE, SECURE EQUIJOIN METHOD, AND PROGRAM

(71) Applicant: NIPPON TELEGRAPH AND TELEPHONE CORPORATION, Chiyoda-ku (JP)

(72) Inventors: Dai Ikarashi, Musashino (JP); Naoto Kiribuchi, Musashino (JP); Koki Hamada, Musashino (JP); Gembu Morohashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 406 days.

(21) Appl. No.: 16/330,212

(22) PCT Filed: Sep. 14, 2017

(86) PCT No.: PCT/JP2017/033283
§ 371 (c)(1),
(2) Date: Mar. 4, 2019

(87) PCT Pub. No.: WO2018/061800
PCT Pub. Date: Apr. 5, 2018

(65) Prior Publication Data
US 2019/0228010 A1 Jul. 25, 2019

(30) Foreign Application Priority Data
Sep. 27, 2016 (JP) .............................. JP2016-187782

(51) Int. Cl.
*G06F 16/2455* (2019.01)
*G09C 1/00* (2006.01)
(Continued)

(52) U.S. Cl.
CPC ............ *G06F 16/2456* (2019.01); *G06F 7/24* (2013.01); *G06F 7/76* (2013.01); *G09C 1/00* (2013.01); *H04L 9/0618* (2013.01); *H04L 9/085* (2013.01)

(58) Field of Classification Search
CPC .......... G06F 16/2456; G06F 7/24; G06F 7/76; G09C 1/00; H04L 9/0618; H04L 9/085; H04L 9/0894; H04L 2209/46
See application file for complete search history.

(56) References Cited

U.S. PATENT DOCUMENTS

| 2013/0117255 A1* | 5/2013 | Liu ...................... G06F 16/283 707/714 |
| 2013/0179470 A1* | 7/2013 | Yasuoka ............. G06F 16/2456 707/792 |
| 2014/0380051 A1* | 12/2014 | Branish, II .......... G06F 21/6227 713/169 |

OTHER PUBLICATIONS

Extended European Search Report dated Apr. 21, 2020 for corresponding European Patent Application No. 17855756.7, (7 pages).
(Continued)

*Primary Examiner* — Robert W Beausoliel, Jr.
*Assistant Examiner* — Mohammad Solaiman Bhuyan
(74) *Attorney, Agent, or Firm* — Oblon, McClelland, Maier & Neustadt, L.L.P.

(57) ABSTRACT

A secure equijoin technique of generating one table from two tables while curbing the volume of communications traffic is provided. The technique includes: a first permutation generating means 110 that generates a permutation $<\sigma>$ from an element sequence which is generated from the first column of a table L and the first column of a table R; a first column generating means 120 that generates, for $j=2, \ldots,$ a, by using the permutation $<\sigma>$, a prefix sum, and an inverse permutation $<\sigma^{-1}>$, the j-th column of a table J from an element sequence which is generated from the to j-th (Continued)

column of the table L; a join-result element sequence generating means 130 that generates a join-result element sequence from an element sequence ($[[1]], \ldots, [[1]], [[0]], \ldots, [[0]], [[-1]], \ldots, [[-1]]$) by using the permutation $<\sigma>$, the prefix sum, and the inverse permutation $<\sigma^{-1}>$; a second column generating means 140 that generates, for $j=a+1, \ldots, a+b-1$, the j-th column of the table J by using the join-result element sequence and the j−a+1-th column of the table R; and a third column generating means 150 that generates the first column of the table J by using the join-result element sequence and the first column of the table R.

8 Claims, 9 Drawing Sheets

(51) Int. Cl.
  *H04L 9/06* (2006.01)
  *G06F 7/24* (2006.01)
  *G06F 7/76* (2006.01)
  *H04L 9/08* (2006.01)

(56) References Cited

OTHER PUBLICATIONS

Rosario Gennaro, et al., "Simplified VSS and Fast-track Multiparty Computations with Applications to Threshold Cryptography", Principles of Distributed Computing, Jun. 1, 1998, XP058228614, pp. 101-111.

International Search Report dated Dec. 19, 2017 in PCT/JP2017/033283 filed on Sep. 14, 2017.

Chida, K. et al., "A Three-Party Secure Function Evaluation with Lightweight Verifiability Revisited", CSS2010, 2010, 6 pages, with English Abstract.

Hamada, K. et al., "An Equijoin Algorithm Based on Non-unique Key Columns for Secure Multi-party Computation", Symposium on Cryptography and Information Security (SCIS) 2015, The Institute of Electronics, Information and Communication Engineers, 2015, pp. 1-6, with English Abstract.

Shamir, A., "How to Share a Secret", Communications of the ACM, vol. 22, No. 11, 1979, pp. 612-613.

Ben-Or, M. et al., "Completeness Theorems for Non-Cryptographic Fault-Tolerant Distributed Computation", Proceedings of the twentieth annual ACM symposium of Theory of computing, ACM, 1988, pp. 1-10.

Gennaro, R. et al., "Simplified VSS and Fast-track Multiparty Computations with Applications to Threshold Cryptography", Proceedings of the seventeenth annual ACM symposium on Principles of distributed computing, ACM, 1998, 11 pages.

Ikarashi, D. et al., "An Improvement of Secure Sorting toward 1 sec. Response on Internet", Symposium on Cryptography and Information Security (SCIS) 2014, The Institute of Electronics, Information, and Communication Engineers, 2014, 9 pages.

Ito, M. et al., "Secret Sharing Scheme Realizing General Access Structure", Electronics and Communications in Japan (Part III: Fundamental Electronic Science), vol. 72, No. 9, 1987, pp. 99-102.

Hamada, K. et al., "A Random Permutation Protocol on Three-Party Secure Function Evaluation", Computer Security Symposium (CSS) 2010, IPSJ-CSEC, 2010, 6 pages.

\* cited by examiner

TABLE $L_s$ TO BE INPUT

| No. | HEIGHT (cm) | WEIGHT (kg) |
|---|---|---|
| 3 | 200 | 100 |
| 5 | 110 | 19 |
| 9 | 160 | 85 |

FIG. 1A

TABLE $R_s$ TO BE INPUT

| No. | PURCHASE |
|---|---|
| 3 | DELICIOUS WATER |
| 7 | MIX AU LAIT |
| 9 | VULNERARY |
| 9 | DELICIOUS WATER |

FIG. 1B

TABLE $J_s$ TO BE OUTPUT

| No. | HEIGHT (cm) | WEIGHT (kg) | PURCHASE |
|---|---|---|---|
| 3 | 200 | 100 | DELICIOUS WATER |
| 9 | 160 | 85 | VULNERARY |
| 9 | 160 | 85 | DELICIOUS WATER |

FIG. 1C

TABLE L TO BE INPUT

| $[[p_1]]$ | $[[v_{1,2}]]$ | ... | $[[v_{1,a}]]$ |
|---|---|---|---|
| $[[p_2]]$ | $[[v_{2,2}]]$ | ... | $[[v_{2,a}]]$ |
| ... | ... | ... | ... |
| $[[p_m]]$ | $[[v_{m,2}]]$ | ... | $[[v_{m,a}]]$ |

FIG. 2A

TABLE R TO BE INPUT

| $[[q_1]]$ | $[[u_{1,2}]]$ | ... | $[[u_{1,b}]]$ |
|---|---|---|---|
| $[[q_2]]$ | $[[u_{2,2}]]$ | ... | $[[u_{2,b}]]$ |
| ... | ... | ... | ... |
| $[[q_n]]$ | $[[u_{n,2}]]$ | ... | $[[u_{n,b}]]$ |

FIG. 2B

TABLE J TO BE OUTPUT

| $[[q'_1]]$ | $[[v'_{1,2}]]$ | ... | $[[v'_{1,a}]]$ | $[[u'_{1,2}]]$ | ... | $[[u'_{1,b}]]$ |
|---|---|---|---|---|---|---|
| $[[q'_2]]$ | $[[v'_{2,2}]]$ | ... | $[[v'_{2,a}]]$ | $[[u'_{2,2}]]$ | ... | $[[u'_{2,b}]]$ |
| ... | ... | ... | ... | ... | ... | ... |
| $[[q'_n]]$ | $[[v'_{n,2}]]$ | ... | $[[v'_{n,a}]]$ | $[[u'_{n,2}]]$ | ... | $[[u'_{n,b}]]$ |

FIG. 2C

| SECURE EQUIJOIN ALGORITHM (FIRST EMBODIMENT) |
|---|
| Input: TABLES L, R <br> Output: TABLE J <br> 1: $\langle\sigma\rangle \leftarrow \text{sort}([[p_1]],...,[[p_m]],[[q_1]],...,[[q_n]],[[p_1]],...,[[p_m]])$ <br> 2: for j=2 to a do <br> 3:    $[[f]] \leftarrow ([[v_{1,j}]],...,[[v_{m,j}]],\underbrace{[[0]],...,[[0]]}_{n},[[-v_{1,j}]],...,[[-v_{m,j}]])$ <br> 4:    $[[g]] \leftarrow [[\sigma([[f]])]]$ <br> 5:    $[[g']] \leftarrow \text{PrefixSum}([[g]])$ <br> 6:    $[[f']] \leftarrow [[\sigma^{-1}([[g']])]]$ <br> 7:    $([[v'_{1,j}]],...,[[v'_{n,j}]]) \leftarrow ([[f'_{m+1}]],...,[[f'_{m+n}]])$ <br> 8: end for <br> 9: $[[f1]] \leftarrow (\underbrace{[[1]],...,[[1]]}_{m},\underbrace{[[0]],...,[[0]]}_{n},\underbrace{[[1]],...,[[1]]}_{m})$ <br> 10: $[[g1]] \leftarrow [[\sigma([[f1]])]]$ <br> 11: $[[g1']] \leftarrow \text{PrefixSum}([[g1]])$ <br> 12: $[[f1']] \leftarrow [[\sigma^{-1}([[g1']])]]$ <br> 13: $([[e_1]],...,[[e_n]]) \leftarrow ([[f1'_{m+1}]],...,[[f1'_{m+n}]])$ <br> 14: for j=2 to b do <br> 15:   for i=1 to n do <br> 16:     $[[u'_{i,j}]] \leftarrow [[e_i]] \times [[u_{i,j}]]$ <br> 17:   end for <br> 18: end for <br> 19: for i=1 to n do <br> 20:   $[[q'_i]] \leftarrow [[e_i]] \times [[q_i]]$ <br> 21: end for |

FIG. 3

TABLE J TO BE OUTPUT (PLAINTEXT)

| No. | HEIGHT (cm) | WEIGHT (kg) | PURCHASE |
|---|---|---|---|
| 3 | 200 | 100 | DELICIOUS WATER |
| 0 | 0 | 0 | 0 |
| 9 | 160 | 85 | VULNERARY |
| 9 | 160 | 85 | DELICIOUS WATER |

| SECURE EQUIJOIN ALGORITHM (SECOND EMBODIMENT) |
|---|
| Input: JOIN-RESULT ELEMENT SEQUENCE ($[[e_1]], .., [[e_n]]$) AND TABLE J<br>Output: TABLE J' (OBTAINED BY MOVING ROW WHOSE ALL ELEMENTS ARE $[[0]]$ TO LOWER SIDE)<br>1: $<\sigma\sim> \leftarrow \text{sort}([[e_1]],..,[[e_n]])$<br>2: $([[q''_1]],..,[[q''_n]]) \leftarrow [[\sigma\sim([[q'_1]],..,[[q'_n]])]]$<br>3: for j=2 to a do<br>4:    $([[v''_{1,j}]],..,[[v''_{n,j}]]) \leftarrow [[\sigma\sim([[v'_{1,j}]],..,[[v'_{n,j}]])]]$<br>5: end for<br>6: for j=2 to b do<br>7:    $([[u''_{1,j}]],..,[[u''_{n,j}]]) \leftarrow [[\sigma\sim([[u'_{1,j}]],..,[[u'_{n,j}]])]]$<br>8: end for |

FIG. 8

TABLE J' TO BE OUTPUT (PLAINTEXT)

| No. | HEIGHT (cm) | WEIGHT (kg) | PURCHASE |
|---|---|---|---|
| 3 | 200 | 100 | DELICIOUS WATER |
| 9 | 160 | 85 | VULNERARY |
| 9 | 160 | 85 | DELICIOUS WATER |
| 0 | 0 | 0 | 0 |

FIG. 9

| SECURE EQUIJOIN ALGORITHM (THIRD EMBODIMENT) |
|---|
| Input: $([[e_1]], .., [[e_n]])$ AND TABLE J' OF SECURE EQUIJOIN ALGORITHM (SECOND EMBODIMENT)<br>Output: TABLE J" (OBTAINED BY REMOVING ROW WHOSE ALL ELEMENTS ARE 0)<br>1: $[[c]] \leftarrow \Sigma_{i=1,..,n}[[e_i]]$<br>2: RELEASE c WHICH IS OBTAINED BY RECONSTRUCTING $[[c]]$ AND OUTPUT ONLY c ROWS FROM TOP OF TABLE J' |

FIG. 12

TABLE J" TO BE OUTPUT (PLAINTEXT)

| No. | HEIGHT (cm) | WEIGHT (kg) | PURCHASE |
|---|---|---|---|
| 3 | 200 | 100 | DELICIOUS WATER |
| 9 | 160 | 85 | VULNERARY |
| 9 | 160 | 85 | DELICIOUS WATER |

FIG. 13

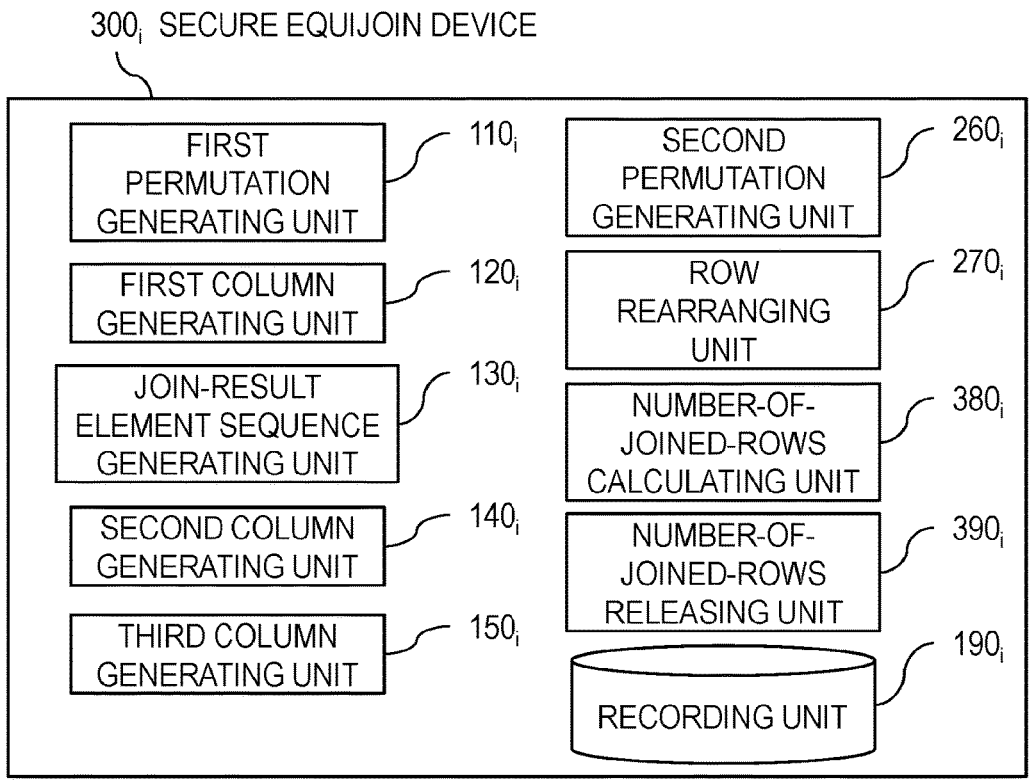

FIG. 14

SECURE EQUIJOIN SYSTEM, SECURE EQUIJOIN DEVICE, SECURE EQUIJOIN METHOD, AND PROGRAM

TECHNICAL FIELD

The present invention relates to an equijoin technique of performing an equijoin of two tables by using a common key attribute of the two tables with information contained in the tables kept secret by secure computation.

BACKGROUND ART

As a method of obtaining the computation result of a designated computation without reconstructing the encrypted numerical values, there is a method called secure computation (see, for example, Non-patent Literature 1). With the method of Non-patent Literature 1, it is possible to perform encryption by which a plurality of pieces of information, whose numerical values can be reconstructed, are distributed over three secure computation devices and to make the three secure computation devices hold the results of addition and subtraction, constant addition, multiplication, constant multiplication, logical operations (a NOT, an AND, an OR, and an XOR), and data format conversion (an integer or a binary) with the results being distributed over these secure computation devices, that is, in an encrypted state, without reconstructing the numerical values. In general, the number of secure computation devices over which the information is distributed is not limited to 3 and can be set at W (W is a predetermined constant greater than or equal to 3), and a protocol that implements secure computation by cooperative computations by W secure computation devices is called a multi-party protocol.

Incidentally, in database processing which is performed on tables, in many cases, data is managed in units of tables, each being made up of a set of records (rows of tables illustrated in FIGS. 1A and 1B), each being made up of a tuple of a plurality of attribute values (which are values corresponding to attributes; in an example of tables of FIGS. 1A to 1C, for instance, specific values "3", "200", "100", and "delicious water" of No., height, weight, and purchase, respectively, which are the attributes). One of the important processing steps of the database processing is an equijoin. The equijoin is a calculation that uses a plurality of tables such as those depicted in FIGS. 1A and 1B as input, extracts records which share a value (a key attribute value) of an attribute called a key (,a key attribute,) in all the tables, and obtains a new table with these records arranged in a horizontal row. For instance, if an equijoin of a table $L_s$ of FIG. 1A and a table $R_s$ of FIG. 1B is performed with reference to a key attribute (in this example, No.) shared by these tables, a table $J_s$ depicted in FIG. 1C is obtained. In the relational database, it is common to manage data by dividing the data into many small tables and perform processing by performing an equijoin of necessary tables when the data is used; therefore, the equijoin is very important processing.

As a method that implements an equijoin of tables by secure computation, there is the method of Non-patent Literature 2. The method of Non-patent Literature 2 implements an equijoin of a plurality of tables having an overlap between key attribute values.

PRIOR ART LITERATURE

Non-Patent Literature

Non-patent Literature 1: Koji Chida, Koki Hamada, Dai Ikarashi, Katsumi Takahashi, "A Three-party Secure Function Evaluation with Lightweight Verifiability Revisited", In CSS, 2010.

Non-patent Literature 2: Koki Hamada, Naoto Kiribuchi, Dai Ikarashi, "An Equijoin Algorithm Based on Non-unique Key Columns for Secure Multi-party Computation", Symposium on Cryptography and Information Security (SCIS) 2015, the Institute of Electronics, Information and Communication Engineers, 2015.

SUMMARY OF THE INVENTION

Problems to be Solved by the Invention

When an evaluation of computation efficiency is performed on the assumption that secure computation is implemented by a multi-party protocol, since the multi-party protocol is a scheme that performs cooperative computations while carrying out communications between a plurality of parties (participants) and, in a common system configuration, a time required for communications is significantly long compared to local computation which each party performs alone, the local computation can be regarded as being negligible. Therefore, an evaluation of computation efficiency is performed by using the amount of data transmitted and received in communication (the volume of communications traffic) as a measure.

In this case, with the method of Non-patent Literature 2, if the numbers of rows of two tables to be joined are assumed to be m and n and the maximum number of overlapping elements of a key attribute to be joined is assumed to be k, communications of $O(k(m+n)\log(m+n))$ are needed, causing a problem of an increase in communications required between servers, which store data in a concealed state, when an equijoin is performed. In particular, if an attribute, like an attribute "purchase" of FIG. 1B described above, may appear several times for a key attribute "No.", the value of k becomes large, which makes the problem manifest.

Thus, an object of the present invention is to provide an equijoin technique of generating one table, which is kept secret, from two tables, which are kept secret, while curbing the volume of communications traffic with the information contained in the tables being kept secret by secure computation.

Means to Solve the Problems

An aspect of the present invention is a secure equijoin system in which $Z_N$ is assumed to be a finite ring formed of a set of integers from 0 to N (N is an integer greater than or equal to 1), m and n are assumed to be integers greater than or equal to 1, a and b are assumed to be integers greater than or equal to 2, and $p_i$ ($1 \leq i \leq m$), $v_{i,j}$ ($1 \leq i \leq m$, $2 \leq j \leq a$), $q_i$ ($1 \leq i \leq n$), and $u_{i,j}$ ($1 \leq i \leq n$, $2 \leq j \leq b$) are assumed to be elements, which are not 0, of the finite ring $Z_N$, [[x]] is assumed to be a value obtained by concealing $x \in Z_N$ and $<\pi>$ is assumed to denote a permutation $\pi$ by secure computation, the secure equijoin system is configured with three or more secure equijoin devices and generates a table J having n rows and a+b−1 columns from a table L having m rows and a columns with elements being concealed and a table R having n rows and b columns with elements being concealed. The secure equijoin system includes: a first permutation generating means that generates a permutation $<\sigma>$ by performing a stable sort on an element sequence ([[$p_1$]], . . . , [[$p_m$]], [[$q_1$]], . . . , [[$q_n$]], [[$p_1$]], . . . , [[$p_m$]]) which is generated from the first column ([[$p_1$]], . . . , [[$p_m$]]) of the table L and the first column ([[$q_1$]], . . . , [[$q_n$]]) of the table R; a first column generating means that generates the second to a-th columns of the table J by generating, for j=2, . . . , a, (1) an element sequence $[[f]]=([[v_{i,j}]], \ldots, [[v_{m,j}]], [[0]], \ldots, [[0]], [[-v_{1,j}]], \ldots, [[-v_{m,j}]])$ by using the j-th column $([[v_{1,j}]], \ldots, [[v_{m,j}]])$ of the table L and an element sequence $([[0]], \ldots, [[0]])$ obtained by arranging n $[[0]]$, (2) an element sequence $[[g]]=[[\sigma([[f]])]]$ from the element sequence $[[f]]$ by using the permutation $<\sigma>$, (3) an element sequence $[[g']]=\mathrm{PrefixSum}([[g]])$ by calculating the prefix sum of the element sequence $[[g]]$, (4) an element sequence $[[f']]=[[\sigma^{-1}([[g']])]]$ from the element sequence $[[g']]$ by using an inverse permutation $<\sigma^{-1}>$ of the permutation $<\sigma>$, and (5) the j-th column $([[v'_{1,j}]], \ldots, [[v'_{n,j}]])=([[f'_{m+1}]], \ldots, [[f'_{m+n}]])$ of the table J by extracting a partial element sequence $([[f'_{m+1}]], \ldots, [[f'_{m+n}]])$ of the m+1- to m+n-th elements of the element sequence $[[f']]$; a join-result element sequence generating means that generates (1) an element sequence $[[f1]]=([[1]], \ldots, [[1]], [[0]], \ldots, [[0]], [[-1]], \ldots, [[-1]])$ by using an element sequence $([[1]], \ldots, [[1]])$ of m $[[1]]$ and an element sequence $([[0]], \ldots, [[0]])$ of n $[[0]]$, (2) an element sequence $[[g1]]=[[\sigma([[f1]])]]$ from the element sequence $[[f1]]$ by using the permutation $<\sigma>$, (3) an element sequence $[[g1']]=\mathrm{PrefixSum}([[g1]])$ by calculating a prefix sum of the element sequence $[[g1]]$, (4) an element sequence $[[f1']]=[[\sigma^{-1}([[g1']])]]$ from the element sequence $[[g1']]$ by using the inverse permutation $<\sigma^{-1}>$, and (5) a join-result element sequence $([[e_1]], \ldots, [[e_n]])=([[f1'_{m+1}]], \ldots, [[f1'_{m+n}]])$ by extracting a partial element sequence $([[f1'_{m+1}]], \ldots, [[f1'_{m+n}]])$ of the m+1- to m+n-th elements of the element sequence $[[f1']]$; a second column generating means that generates the a+1- to a+b−1-th columns of the table J by generating, for j=a+1, . . . , a+b−1, the j-th column $([[u'_{1,j-a+1}]], \ldots, [[u'_{n,j-a+1}]])=([[e_1]]\times[[u_{1,j-a+1}]], \ldots, [[e_n]]\times[[u_{n,j-a+1}]])$ of the table J by using the join-result element sequence $([[e_1]], \ldots, [[e_n]])$ and the j−a+1-th column $([[u_{1,j-a+1}]], \ldots, [[u_{m,j-a+1}]])$ of the table R; and a third column generating means that generates a first column $([[q'_1]], \ldots, [[q'_n]])=([[e_1]]\times[[q_1]], \ldots, [[e_n]]\times[[q_n]])$ of the table J by using the join-result element sequence $([[e_1]], \ldots, [[e_n]])$ and the first column $([[q_1]], \ldots, [[q_n]])$ of the table R.

Effects of the Invention

According to the present invention, if the numbers of rows of two tables on which an equijoin is to be performed are assumed to be m and n, it is possible to reduce the volume of communications traffic required for an equijoin to O((m+n)log(m+n)).

BRIEF DESCRIPTION OF THE DRAWINGS

FIG. 1A is a diagram (a diagram of a table $L_s$ to be input) depicting an example in which one table is generated from two tables by an equijoin.

FIG. 1B is a diagram (a diagram of a table $R_s$ to be input) depicting the example in which one table is generated from two tables by an equijoin.

FIG. 1C is a diagram (a diagram of a table J to be output) depicting the example in which one table is generated from two tables by an equijoin.

FIG. 2A is a diagram (a diagram of a table L to be input) depicting two tables, which are input to a secure equijoin algorithm of a first embodiment, and one table, which is output of the secure equijoin algorithm of the first embodiment.

FIG. 2B is a diagram (a diagram of a table R to be input) depicting two tables, which are input to the secure equijoin algorithm of the first embodiment, and one table, which is output of the secure equijoin algorithm of the first embodiment.

FIG. 2C is a diagram (a diagram of a table J to be output) depicting two tables, which are input to the secure equijoin algorithm of the first embodiment, and one table, which is output of the secure equijoin algorithm of the first embodiment.

FIG. 3 is a diagram depicting procedures of the secure equijoin algorithm of the first embodiment.

FIG. 8 is a diagram depicting procedures of a secure equijoin algorithm of a second embodiment.

FIG. 9 is a diagram depicting an example of a table J' (plaintext) which is the output result of the secure equijoin algorithm of the second embodiment.

FIG. 12 is a diagram depicting procedures of a secure equijoin algorithm of a third embodiment.

FIG. 13 is a diagram depicting an example of a table J" (plaintext) which is the output result of the secure equijoin algorithm of the third embodiment.

FIG. 14 is a block diagram depicting the configuration of a secure equijoin device $300_i$.

DETAILED DESCRIPTION OF THE EMBODIMENTS

Figures 4, 5:
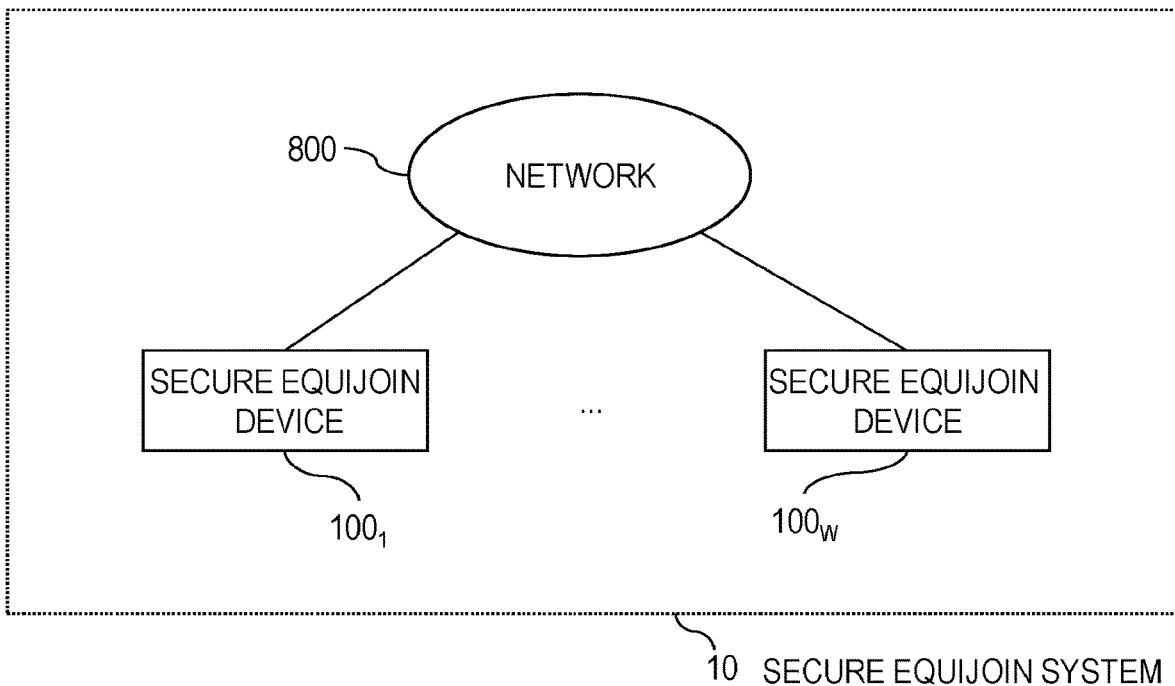
FIG. 4 is a diagram depicting an example of the table J (plaintext) which is the output result of the secure equijoin algorithm of the first embodiment.
FIG. 5 is a block diagram depicting the configuration of a secure equijoin system 10.

Hereinafter, embodiments of the present invention will be described in detail. It is to be noted that constituent units having the same function will be identified with the same reference character and overlapping explanations will be omitted.

A secure equijoin algorithm, which will be described later, is constructed by combining computations on the existing secure computation. These computations required by the secure equijoin algorithm are concealment and reconstruction, addition, multiplication, a prefix sum, a permutation, an inverse permutation, and a stable sort. Necessary definitions and notation will be described prior to the description of each computation.

Definitions and Notation $Z_N$ is assumed to be a set of integers from 0 to N (N is an integer greater than or equal to 1). That is, $Z_N=\{0, \ldots, N\}$ and $Z_N$ forms a finite ring.

$[[x]]$ is assumed to be a value (concealed text) obtained by concealing $x \in Z_N$ by encryption or secret sharing. Moreover, x is referred to as plaintext of $[[x]]$.

$[[x]]+[[y]]$ is assumed to be addition by secure computation, which receives $[[x]]$ and $[[y]]$ as input and outputs $[[x+y]]$.

[[x]]×[[y]] is assumed to be multiplication by secure computation, which receives [[x]] and [[y]] as input and outputs [[x×y]].

PrefixSum([[x$_1$]], . . . , [[x$_n$]]) is a computation which obtains an element sequence called a prefix sum from an element sequence ([[x$_1$]], . . . , [[x$_n$]]), and the details thereof will be described later.

<σ> denotes a permutation a by secure computation. The details thereof will be described later.

An element sequence ([[f$_1$]], . . . , [[f$_n$]]) obtained by concealing the elements of an element sequence f=(f$_1$, . . . , f$_n$) is denoted as [[f]]. That is, [[f]]=([[f$_1$]], . . . , [[f$_n$]]).

[[σ([[f]])]] denotes an element sequence obtained by permuting an element sequence [[f]] by a permutation σ.

Sort([[x$_1$, . . . , x$_n$]]) denotes a stable sort that receives an element sequence ([[x$_1$]], . . . , [[x$_n$]]) as input and outputs a permutation <σ>.

Computation Algorithm

Concealment and Reconstruction

As a method of obtaining [[x]] from x∈Z$_N$ (concealment) and a method of obtaining x∈Z$_N$ from [[x]] (reconstruction), there are, specifically, the technique of Chida et al. (Non-patent Literature 1) and the technique of Shamir (Reference Non-patent Literature 1).
(Reference Non-patent Literature 1) Shamir, A., "How to share a secret", Communications of the ACM, Vol. 22, No. 11, pp. 612-613, 1979.

An example of concealment will be described. If participants in a multi-party protocol are assumed to be X, Y, and Z, x∈Z$_N$ is distributed over a plurality of (for instance, three) secret values and [[x]] denotes a set of a plurality of secret values x$_i$ (i∈{1, 2, 3}). Although the participants X, Y, and Z hold part of the secret values x$_i$ (i∈{1, 2, 3}) allocated to the participants, the participants X, Y, and Z do not hold all of the secret values x$_i$ (i∈{1, 2, 3}). For instance, the participant X is assumed to hold a set {x$_2$, x$_3$}, the participant Y is assumed to hold a set {x$_1$, x$_3$}, and the participant Z is assumed to hold a set {x$_1$, x$_2$}.

Addition, Multiplication

Addition is an algorithm of obtaining [[c]] in a concealed state, c=a+b when provided with [[a]] and [[b]] of a, b∈Z$_N$. Specifically, the technique of Ben-Or et al. (Reference Non-patent Literature 2) is known, and communications between participants in a multi-party protocol is not needed.

Multiplication is an algorithm of obtaining [[c]] in a concealed state, c=a×b when provided with [[a]] and [[b]] of a, b∈Z$_N$. Specifically, the method of Gennaro et al. (Reference Non-patent Literature 3) can be used. In this method, communications between participants in a multi-party protocol is needed.
(Reference Non-patent Literature 2) Ben-Or, M., Goldwasser, S. and Wigderson, A., "Completeness theorems for non-cryptographic fault-tolerant distributed computation", Proceedings of the twentieth annual ACM symposium on Theory of computing, ACM, pp. 1-10, 1998. (Reference Non-patent Literature 3) Gennaro, R., Rabin, M. O. and Rabin, T., "Simplified VSS and fast-track multiparty computations with applications to threshold cryptography", Proceedings of the seventeenth annual ACM symposium on Principles of distributed computing, ACM, pp. 101-111, 1998.

Prefix-Sum (Prefix Sum)

An operation of obtaining, for a plurality of elements arranged in order (an element sequence), the sum of an element and all the elements that have appeared before and the resultant element sequence are referred to as a prefix sum. That is, a prefix sum is an operation of obtaining, when provided with an element sequence ([[x$_1$]], . . . , [[x$_n$]]), an element sequence ([[y$_1$]], . . . , [[y$_n$]]) by using y$_i$ given by the following formula.

$$y_i = \sum_{j=1}^{i} x_j \qquad (1)$$

In the following description, this operation is written as ([[y$_1$]], . . . , [[y$_n$]])←PrefixSum([[x$_1$]], . . . , [[x$_n$]]). By using the technique of Ben-Or et al. (Reference Non-patent Literature 2) as the addition algorithm, a prefix sum does not need communications between participants in a multi-party protocol.

Permutation

An operation of rearranging the elements arranged in order and a mapping thereof are referred to as a permutation. For example, an operation of rearranging (1, 2, 3) into (3, 1, 2) is regarded as a permutation by a mapping σ that satisfies σ(1)=3, σ(2)=1, and σ(3)=2. By the nature of a mapping, a plurality of permutations can be combined. That is, a composite permutation σ·π of permutations σ and π maps an element x onto σ(π(x)).

As one of the methods that implement a permutation <σ> by secure computation, the technique of Ikarashi et al. (Reference Non-patent Literature 4) can be used.
(Reference Non-patent Literature 4) Dai Ikarashi, Koki Hamada, Ryo Kikuchi, Koji Chida, "An Improvement of Secure Sorting toward 1 sec. Response on Internet", Symposium on Cryptography and Information Security (SCIS) 2014, the Institute of Electronics, Information and Communication Engineers, 2014.

In this method, for example, if participants in a multi-party protocol are assumed to be X, Y, and Z, a permutation σ is assumed to be a composite permutation of permutations σ$_{XY}$, σ$_{YZ}$, and σ$_{ZX}$ which satisfies σ=σ$_{ZX}$·σ$_{YZ}$·σ$_{XY}$. The permutation σ$_{XY}$ is a permutation shared only by the participant X and the participant Y, and the participant Z is not informed of the permutation σ$_{XY}$. The participant Z obtains the concealed element sequence permuted by σ$_{XY}$ by re-sharing from the participant X and the participant Y. The same goes for the permutations σ$_{YZ}$ and σ$_{ZX}$; therefore, for each of the participants, a permutation which the participant does not know is included. This makes it possible for all the participants to execute the permutation <σ> by secure computation without knowing a correlation.

Here, the permutation <σ> can be regarded as replicated secret sharing (Reference Non-patent Literature 5) divided into the permutations σ$_{XY}$, σ$_{YZ}$, and σ$_{ZX}$ whose order of application is determined. This is generalization of shuffle of Hamada et al. (Reference Non-patent Literature 6) with σ being set as a random permutation, and the communications cost is linear with respect to an input size.
(Reference Non-patent Literature 5) Ito, M., Saito, A. and Nishizeki, T., "Secret sharing scheme realizing general access structure", Electronics and Communications in Japan (Part III: Fundamental Electronic Science), Vol. 72, No. 9, pp. 56-64, 1989.

(Reference Non-patent Literature 6) Koki Hamada, Dai Ikarashi, Koji Chida, Katsumi Takahashi, "A Random Permutation Protocol on Three-Party Secure Function Evaluation", Computer Security Symposium (CSS) 2010, IPSJ-CSEC, 2010.

Inverse Permutation

A permutation has an inverse mapping because it is a bijection. Thus, the inverse mapping of a permutation σ is referred to as an inverse permutation and denoted by $\sigma^{-1}$. That is, when $\sigma(x)=y$, $\sigma^{-1}(y)=x$. In particular, $\sigma^{-1} \cdot \sigma$ is a permutation called an identity permutation, which does not change the order.

A method of an inverse permutation $<\sigma^{-1}>$ by secure computation is similar to the method in the case of a permutation. When a permutation $<\sigma>$ is provided as a composite permutation of permutations $\sigma_{XY}$, $\sigma_{YZ}$, and $\sigma_{ZX}$ which make $\sigma=\sigma_{ZX} \cdot \sigma_{YZ} \cdot \sigma_{XY}$ hold, since an inverse permutation is $\sigma^{-1}=\sigma_{XY}^{-1} \cdot \sigma_{YZ}^{-1} \cdot \sigma_{ZX}^{-1}$, the order of inverse permutations of permutations held by the participants X, Y, and Z only has to be inverted before being applied.

Stable Sort

Rearrangement by which the order relation of identical elements is maintained is referred to as a stable sort. That is, in a stable sort σ that rearranges $(x_1, \ldots, x_n)$ into $(y_1, \ldots, y_n)$, if $\sigma(x_i)=y_u$ and $\sigma(x_j)=y_v$ when $x_i=x_j$, $u<v$ holds only when $i<j$.

Examples of a technique by secure computation include the method of Ikarashi et al. (Reference Non-patent Literature 4). In the following description, an output by a stable sort for an element sequence $([[x_i]], \ldots, [[x_n]])$ is assumed to be a permutation $<\sigma>$ and denoted by $<\sigma> \leftarrow \text{Sort}([[x_1]], \ldots, [[x_n]])$.

First Embodiment

Input, output, procedures, and processing cost of a secure equijoin algorithm of a first embodiment and a secure equijoin system that implements the secure equijoin algorithm will be described below.

It is to be noted that, in the following description, when a column of a table is extracted and handled, the column is handled as a sequence of elements arranged in a lateral direction, not in a longitudinal direction.

Input

Two tables to be joined are assumed to be L and R (see FIGS. 2A and 2B). The sizes of the tables are assumed to be set so that the table L has m rows and a columns and the table R has n rows and b columns (m and n are integers greater than or equal to 1, and a and b are integers greater than or equal to 2). Both the tables L and R have key attribute values in the first column, which are assumed to be $([[p_1]], \ldots, [[p_m]])$ and $([[q_1]], \ldots, [[q_n]])$, respectively. The tables L and R have attribute values other than the key attribute values in the second and subsequent columns, and attribute values in the i-th row and the j-th column are assumed to be $[[v_{i,j}]]$ ($1 \le i \le m$, $2 \le j \le a$) and $[[u_{i,j}]]$ ($1 \le i \le n$, $2 \le j \le b$), respectively.

Tables containing elements (hereinafter referred to as plaintext elements) obtained by converting the elements of the tables L and R back to pre-concealed plaintext are assumed to be $L_{plain}$ and $R_{plain}$, respectively. Assume that elements of the same value are not present in an element sequence $(p_1, \ldots, p_m)$ of key attribute values of the table $L_{plain}$ (that is, $p_1, \ldots, p_m$ differ from each other) and overlapping values may be present in an element sequence $(q_1, \ldots, q_n)$ of key attribute values of the table $R_{plain}$. Moreover, plaintext elements $p_i$ ($1 \le i \le m$), $v_{i,j}$ ($1 \le i \le m$, $2 \le j \le a$), $q_i$ ($1 \le i \le n$), and $u_{i,j}$ ($1 \le i \le n$, $2 \le j \le b$) of all the elements to be input are assumed to be values, which are not 0, on a finite ring $Z_N$. If there is a possibility that 0 is included in the plaintext elements, preprocessing is assumed to be performed by uniformly performing addition and subtraction, for example, so that the plaintext elements do not become 0. Moreover, if there is a possibility that the plaintext elements are other than values on the finite ring $Z_N$, such as character strings, preprocessing is assumed to be performed so that the plaintext elements are turned into values on the finite ring $Z_N$.

Output

A table to be output is assumed to be J (see FIG. 2C). The table J is a table having n rows whose i-th ($1 \le i \le n$) row is $([[q'_i]], [[v'_{i,2}]], \ldots, [[v'_{i,a}]], [[u'_{i,2}]], \ldots, [[u'_{i,b}]])$, and, if the same value as the key attribute value $q_i$ of the table $R_{plain}$ is not present in the element sequence $(p_1, \ldots, p_m)$ of the key attribute values of the table $L_{plain}$, all the values in the i-th row are 0, that is, for $2 \le \alpha \le a$ and $2 \le \beta \le b$, $q'_i=0$, $v'_{i,\alpha}=0$, and $u'_{i,\beta}=0$. On the other hand, if a key attribute value $p_j$ of the table $L_{plain}$, which is equal to the key attribute value $q_i$ of the table $R_{plain}$, that is, $q_i=p_j$, is present, $q'_i=q_i$, $v'_{i,\alpha}=v_{j,\alpha}$, and $u'_{i,\beta}=u_{i,\beta}$.

Procedures

The procedures of the secure equijoin algorithm of the first embodiment depicted in FIG. 3 will be described. In so doing, expressions such as Step 1 and Step 2 are adopted by using the numerals on the left end of FIG. 3. Moreover, to make the behavior of the algorithm easily understandable, an explanation will be given by substituting the values of the table $L_s$ of FIG. 1A and the table $R_s$ of FIG. 1B into the table L of FIG. 2A and the table R of FIG. 2B on the assumption that m=3, a=3, n=4, and b=2. That is, an explanation is given in the state of plaintext.

First, in Step 1, a permutation $<\sigma>$ is generated by performing a stable sort on an element sequence $([[p_1]], \ldots, [[p_m]], [[q_1]], \ldots, [[q_n]], [[p_1]], \ldots, [[p_m]])$ which is generated from the key attribute values of the input two tables L and R.

The permutation $<\sigma>$ is a permutation that rearranges an element sequence in the following first line into a sequence in the second line. The first to third values, fourth to seventh values, and eighth to tenth values from the left of the element sequence in the first line are the key attribute values of the table $L_s$, the key attribute values of the table $R_s$, and the key attribute values of the table $L_s$, respectively.

(First line) ([3, [[5, [[9, [3], [7], [9], [9], 3]], 5]], 9]])
(Second line) ([[3, [3], 3]], [[5, 5]], [7], [[9, [9], [9], 9]])

It is to be noted that, here, to make the explanation easy to understand, the positional relationship of identical values before and after a permutation is expressed by distinguishing between them by using symbols [[x, [y], and z]]. However, in actuality, they are processed without being distinguished from each other. [[x and z]] are plaintext corresponding to the attribute values obtained from the table L, and [y] is plaintext corresponding to the attribute value obtained from the table R.

Next, Steps 2 to 8 are processing which is repeated for each column of the table L (j=2, ..., a). In an example of the table $L_s$ of FIG. 1A, there are columns of "height" and "weight" (a=3); here, processing will be described by using the column "weight".

In Step 3, an element sequence $[[f]]=([[v_{1,j}]], \ldots, [[v_{m,j}]], \ldots, [[v_{m,j}]], [[0]], \ldots, [[0]], [[-v_{1,j}]], \ldots, [[-v_{m,j}]])$ is generated by using the j-th column $([[v_{1,j}]], \ldots, [[v_{m,j}]])$ of the table L and an element sequence $([[0]], \ldots, [[0]])$ obtained by arranging n [[0]].

If 100, 19, and 85, which are the values of the column "weight", are used, a plaintext element sequence of the element sequence [[f]] is as follows. It is to be noted that an element sequence ([0], [0], [0], [0]) is a plaintext element sequence of ([[0]], ..., [[0]]).

([[100,[[19,[[85,[0],[0],[0],[0],-100]],-19]],-85]])

In Step 4, an element sequence $[[g]]=[[\sigma([[f]])]]$ is generated from the element sequence [[f]] by using the permutation $<\sigma>$.

By rearranging the plaintext element sequence of the element sequence [[f]] by the permutation $<\sigma>$, a plaintext element sequence of the element sequence [[g]] is obtained.

([[100,[0],-100]],[[19,-19]],[0],[[85,[0],[0],-85]])

In Step 5, an element sequence [[g']]=PrefixSum([[g]]) is generated by calculating the prefix sum of the element sequence [[g]].

A plaintext element sequence of the element sequence [[g']] which is obtained by the prefix sum is as follows.

([[100,[100],0]],[[19,0]],[0],[[85,[85],[85],0]])

It is clear that, by this procedure, the plaintext [[x corresponding to a value in a column of the table L is copied to [y].

Moreover, z]] is a sentinel in programming and indicates a termination of copy of the value of [[x.

In Step 6, an element sequence $[[f']]=[[\sigma^{-1}([[g']])]]$ is generated from the element sequence [[g']] by using an inverse permutation $<\sigma^{-1}>$ of the permutation $<\sigma>$.

By rearranging the plaintext element sequence of the element sequence [[g']] by the inverse permutation $<\sigma^{-1}>$, a plaintext element sequence of the element sequence [[f']] is obtained.

([[100,[[19,[[85,[100],[0],[85],[85],0]],0]],0]])

In Step 7, the j-th column $([[v'_{1,j}]], \ldots, [[v'_{n,j}]])=([[f'_{m+1}]], \ldots, [[f'_{m+n}]])$ of the table J is generated by extracting a partial element sequence $[[f'_{m+1}]], \ldots, [[f'_{m+n}]])$ of the m+1- to m+n-th elements of the element sequence [[f']].

The values in the j-th column of the table J which is generated are [100], [0], [85], and [85], which are the fourth (=3+1) to seventh (=3+4) elements of the plaintext element sequence of the element sequence [[f']]. Here, the value in the second row, which was not joined, of the table J is [0] in plaintext.

Processing from Steps 9 to 13 is the application of processing from Steps 3 to 7 to a virtual column obtained by setting all the values in a column of the table L at [[1]]. Specifically, the processing is as follows.

In Step 9, an element sequence $[[f1]]=([[1]], \ldots, [[1]], [[0]], \ldots, [[0]], [[-1]], [[-1]])$ is generated by using an element sequence $([[1]], \ldots, [[1]])$ of m [[1]] and an element sequence $([[0]], \ldots, [[0]])$ of n [[0]].

A plaintext element sequence of the element sequence [[f1]] is as follows.

([[1,[[1,[[1,[0],[0],[0],[0],-1]],-1]],-1]])

In Step 10, an element sequence $[[g1]]=[[\sigma([[f1]])]]$ is generated from the element sequence [[f1]] by using the permutation $<\sigma>$.

By rearranging the plaintext element sequence of the element sequence [[f1]] by the permutation $<\sigma>$, a plaintext element sequence of the element sequence [[g1]] is obtained.

([[1,[0],-1]],[[1,-1]],[0],[[1,[0],[0],-1]])

In Step 11, an element sequence [[g1']]=PrefixSum([[g1]]) is generated by calculating the prefix sum of the element sequence [[g1]].

A plaintext element sequence of the element sequence [[g1']] which is obtained by the prefix sum is as follows.

([[1,[1],0]],[[1,0]],[0],[[1,[1],[1],0]])

In Step 12, an element sequence $[[f1']]=[[\sigma^{-1}([[g1']])]]$ is generated from the element sequence [[g1']] by using the inverse permutation $<\sigma^{-1}>$.

By rearranging the plaintext element sequence of the element sequence [[g1']] by the inverse permutation $<\sigma^{-1}>$, a plaintext element sequence of the element sequence [[f1']] is obtained.

([[1,[[1,[[1,[1],[0],[1],[1],0]],0]],0]])

In Step 13, a join-result element sequence $([[e_1]], \ldots, [[e_n]])=([[f1'_{m+1}]], \ldots, [[f1'_{m+n}]])$ is generated by extracting a partial element sequence $([[f1'_{m+1}]], \ldots, [[f1'_{m+n}]])$ of the m+1- to m+n-th elements of the element sequence [[f1']]. Here, the join-result element sequence $([[e_1]], \ldots, [[e_n]])$ is a sequence of elements indicating, for a row of the table R, whether or not there was a row to be joined to the table L; if $[[e_i]]=[[1]]$, it indicates that there was a row to be joined to the table L, and, if $[[e_i]]=[[0]]$, it indicates that there was not a row to be joined to the table L.

The values of the join-result element sequence which is generated are [1], [0], [1], and [1], which are the fourth (=3+1) to seventh (=3+4) elements of the plaintext element sequence of the element sequence [[f1']].

Processing from Steps 14 to 21 is processing to turn the values in a row of the table R, which was not joined, into [[0]] by using the join-result element sequence $([[e_1]], \ldots, [[e_n]])$.

In Steps 15 to 17, the j-th column $([[u'_{1, j-a+1}]], \ldots, [[u'_{n, j-a+1}]])=([[e_1]]\times[[u_{1, j-a+1}]] \ldots, [[e_n]]\times[[u_{n, j-a+1}]])$ of the table J is generated by using the join-result element sequence $([[e_1]], \ldots, [[e_n]])$ and the j-a+1-th column $([[u_{1, j-a+1}]], \ldots, [[u_{m, j-a+1}]])$ of the table R (j=a+1, ..., a+b-1).

In Steps 19 to 21, the first column $([[q_1]], \ldots, [[q'_n]])=([[e_1]]\times[[q_1]], \ldots, [[e_n]]\times[[q_n]])$ of the table J is generated by using the join-result element sequence $([[e_1]], \ldots, [[e_n]])$ and the first column $([[q_1]], \ldots, [[q_n]])$ of the table R.

In an example of the table $R_s$ of FIG. 1B, a row of "mix au lait" (the second row), which is not joined, becomes 0 and the same values as the original values are substituted into the other rows. Therefore, the table J (plaintext), which is the output result, is like that shown in FIG. 4.

Processing Cost

Processing which requires communications in the secure equijoin algorithm of the first embodiment is: a stable sort of length 2m+n performed one time in Step 1; a permutation of length 2m+n performed a times in total in Steps 4 and 10; likewise, an inverse permutation of length 2m+n performed a times in total in Steps 6 and 12; and multiplication performed bn times in Steps 16 and 20.

The communications cost of the stable sort is $O((m+n)\log(m+n))$ by the technique of Hamada et al. (Reference Non-patent Literature 6). As for the permutation and the inverse permutation, linear communications with respect to input are required, and, as for the multiplication, a constant amount of communications is required per multiplication. The numbers of columns a and b of the tables can be regarded as constants. Thus, if the numbers of rows of two tables to be input are assumed to be m and n, the volume of communications traffic of the entire processing is $O((m+n)\log(m+n))$.

Secure Equijoin System

Figure 6:
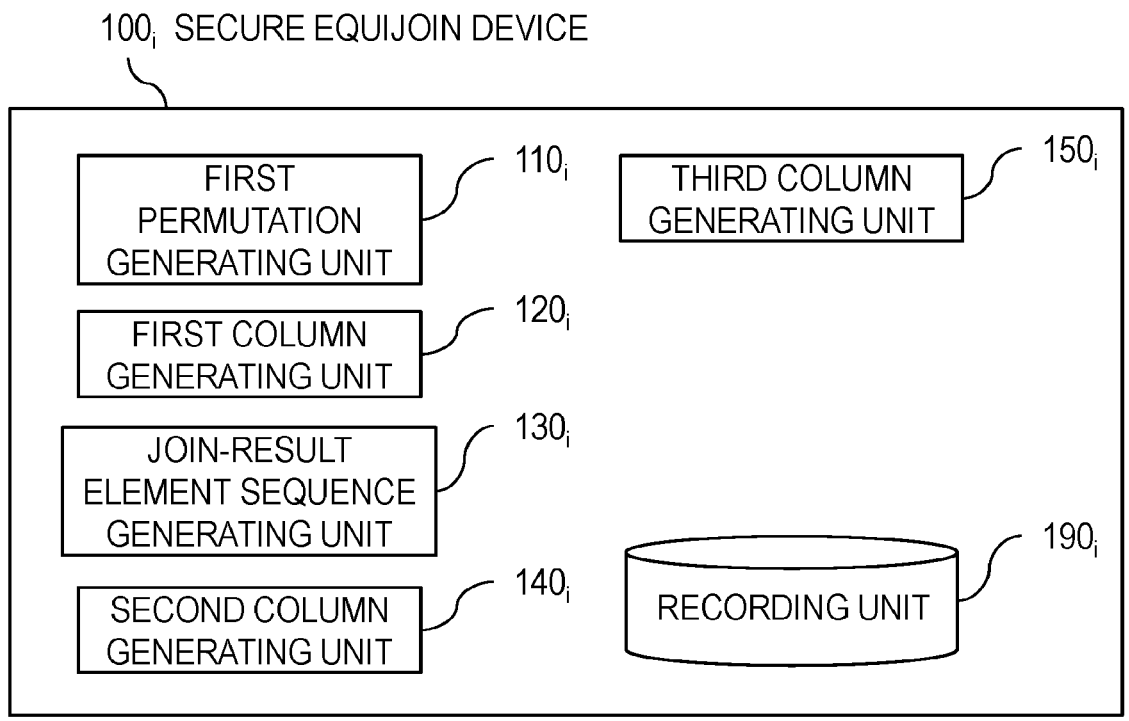
FIG. 6 is a block diagram depicting the configuration of a secure equijoin device $100_i$.
Figure 7:
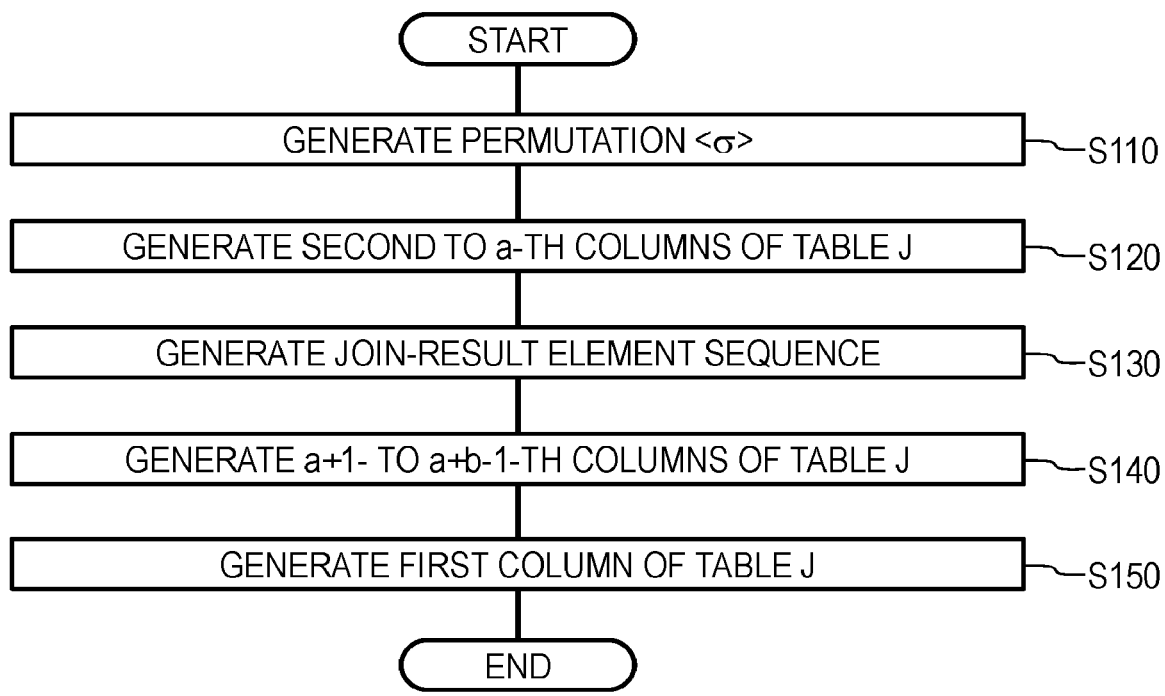
FIG. 7 is a flowchart showing an operation of the secure equijoin system 10.

Hereinafter, a secure equijoin system 10 of the first embodiment will be described with reference to FIGS. 5 to 7. FIG. 5 is a block diagram depicting the configuration of the secure equijoin system 10. The secure equijoin system 10 includes W (W is a predetermined integer greater than or equal to 3) secure equijoin devices $100_1, \ldots, 100_W$. The secure equijoin devices $100_1, \ldots, 100_W$ are connected to a network 800 and can communicate with each other. The network 800 may be, for example, a communications network such as the Internet or a broadcast communication channel. FIG. 6 is a block diagram depicting the configuration of a secure equijoin device $100_i$ ($1 \leq i \leq W$). FIG. 7 is a flowchart showing an operation of the secure equijoin system 10.

As depicted in FIG. 6, the secure equijoin device $100_i$ includes a first permutation generating unit $110_i$, a first column generating unit $120_i$, a join-result element sequence generating unit $130_i$, second column generating unit $140_i$, a third column generating unit $150_i$, and a recording unit $190_i$. Apart from the recording unit $190_i$, the constituent units of the secure equijoin device $100_i$ are configured so as to be capable of executing computations which are required in the secure equijoin algorithm, that is, computations, which are required to implement the functions of the constituent units, of at least concealment, reconstruction, addition, multiplication, a prefix sum, a permutation, an inverse permutation, and a stable sort. In the present invention, as specific functional configurations for implementing individual computations, configurations that can execute the algorithms which are disclosed in Non-patent Literature 1 and Reference Non-patent Literatures 1 to 6, for example, serve the purpose, and their detailed explanations will be omitted because they are the existing configurations. Moreover, the recording unit $190_i$ is a constituent unit that records information which is necessary for processing of the secure equijoin device $100_i$.

By cooperative computations which are performed by the W secure equijoin devices $100_i$, the secure equijoin system 10 implements the secure equijoin algorithm which is a multi-party protocol. Thus, a first permutation generating means 110 (which is not depicted in the drawing) of the secure equijoin system 10 is configured with the first permutation generating units $110_1, \ldots, 110_W$, a first column generating means 120 (which is not depicted in the drawing) is configured with the first column generating units $120_1, \ldots, 120_W$, a join-result element sequence generating means 130 (which is not depicted in the drawing) is configured with the join-result element sequence generating units $130_1, \ldots, 130_W$, a second column generating means 140 (which is not depicted in the drawing) is configured with the second column generating units $140_1, \ldots, 140_W$, and a third column generating means 150 (which is not depicted in the drawing) is configured with the third column generating units $150_1, \ldots, 150_W$.

By using, as input, the table L having m rows and a columns with the elements being concealed and the table R having n rows and b columns with the elements being concealed and performing a secure equijoin on the table L and the table R, the secure equijoin system 10 generates the table J having n rows and a+b−1 columns (see FIG. 2C). Hereinafter, an operation of the secure equijoin system 10 will be described in accordance with FIG. 7.

The first permutation generating means 110 generates a permutation $\langle \sigma \rangle$ by performing a stable sort on an element sequence $([[p_1]], \ldots, [[p_m]], [[q_1]], \ldots, [[q_n]], [[p_1]], \ldots, [[p_m]])$ which is generated from the first column $([[p_1]], \ldots, [[p_m]])$ of the table L and the first column $([[q_1]], \ldots, [[q_n]])$ of the table R (S110). This corresponds to Step 1 of the secure equijoin algorithm of FIG. 3.

The first column generating means 120 generates the second to a-th columns of the table J by executing the following processing for $j=2, \ldots, a$ (S120). This corresponds to Steps 2 to 8 of the secure equijoin algorithm of FIG. 3.

(1) The first column generating means 120 generates an element sequence $[[f]]=([[v_{1,j}]], \ldots, [[v_{m,j}]], [[0]], \ldots, [[0]], [[-v_{1,j}]], \ldots, [[-v_{m,j}]])$ by using the j-th column $([[v_{1,j}]], \ldots, [[v_{m,j}]])$ of the table L and an element sequence $([[0]], \ldots, [[0]])$ obtained by arranging n $[[0]]$.

(2) The first column generating means 120 generates an element sequence $[[g]]=[[\sigma([[f]])]]$ from the element sequence $[[f]]$ by using the permutation $\langle \sigma \rangle$.

(3) The first column generating means 120 generates an element sequence $[[g']]=\mathrm{PrefixSum}([[g]])$ by calculating the prefix sum of the element sequence $[[g]]$.

(4) The first column generating means 120 generates an element sequence $[[f']]=[[\sigma^{-1}([[g']])]]$ from the element sequence $[[g']]$ by using an inverse permutation $\langle \sigma^{-1} \rangle$ of the permutation $\langle \sigma \rangle$.

(5) The first column generating means 120 generates the j-th column $([[v'_{1,j}]], \ldots, [[v'_{n,j}]])=([[f'_{m+1}]], \ldots, [[f'_{m+n}]])$ of the table J by extracting a partial element sequence $([[f'_{m+1}]], \ldots, [[f'_{m+n}]])$ of the m+1- to m+n-th elements of the element sequence $[[f']]$.

The join-result element sequence generating means 130 generates a join-result element sequence $([[e_1]], \ldots, [[e_n]])$ by executing the following processing (S130). This corresponds to Steps 9 to 13 of the secure equijoin algorithm of FIG. 3.

(1) The join-result element sequence generating means 130 generates an element sequence $[[f1]]=([[1]], \ldots, [[1]], [[0]], \ldots, [[0]], [[-1]], \ldots, [[-1]])$ by using an element sequence $([[1]], \ldots, [[1]])$ of m $[[1]]$ and an element sequence $([[0]], \ldots, [[0]])$ of n $[[0]]$.

(2) The join-result element sequence generating means 130 generates an element sequence $[[g1]]=[[\sigma([[f1]])]]$ from the element sequence $[[f1]]$ by using the permutation $\langle \sigma \rangle$.

(3) The join-result element sequence generating means 130 generates an element sequence $[[g1']]=\mathrm{PrefixSum}([[g1]])$ by calculating the prefix sum of the element sequence $[[g1]]$.

(4) The join-result element sequence generating means 130 generates an element sequence $[[F1']]=[[\sigma^{-1}([[g1']])]]$ from the element sequence $[[g1']]$ by using the inverse permutation $<\sigma^{-1}>$.

(5) The join-result element sequence generating means 130 generates a join-result element sequence $([[e_1]], \ldots, [[e_n]])=([[f1'_{m+1}]], \ldots, [[f1'_{m+n}]])$ by extracting a partial element sequence $([[f1'_{m+1}]], \ldots, [[f1'_{m+n}]])$ of the m+1- to m+n-th elements of the element sequence $[[F1']]$.

The second column generating means 140 generates the a+1- to a+b−1-th columns of the table J by executing the following processing for j=a+1, . . . , a+b−1 (S140). This corresponds to Steps 14 to 18 of the secure equijoin algorithm of FIG. 3.

(1) The second column generating means 140 generates the j-th column $([[u'_{1,\,j-a+1}]], \ldots, [[u'_{n,\,j-a+1}]])=([[e_1]]\times[[u_{1,j-a+1}]], \ldots, [[e_n]]\times[[u_{n,j-a+1}]])$ of the table J by using the join-result element sequence $([[e_1]], \ldots, [[e_n]])$ and the j−a+1-th column $([[u_{1,j-a+1}]], \ldots, [[u_{m,j-a+1}]])$ of the table R.

The third column generating means 150 generates the first column $([[q_1']], \ldots, [[q_n']])=([[e_1]]\times[[q_1]], \ldots, [[e_n]]\times[[q_n]])$ of the table J by using the join-result element sequence $([[e_1]], \ldots, [[e_n]])$ and the first column $([[q_1]], \ldots, [[q_n]])$ of the table R (S150). This corresponds to Steps 19 to 21 of the secure equijoin algorithm of FIG. 3.

According to the invention of the present embodiment, by using a permutation which is generated as a result of a stable sort being performed on an element sequence obtained by arranging, by a predetermined method, key attribute values of two tables on which an equijoin is to be performed, it is possible to perform an equijoin even when there is an overlap between the key attribute values in one table. In the existing technique, if the maximum number of overlapping elements is assumed to be k, one element is replaced with k pieces of information which do not overlap each other.

Since this replacement becomes unnecessary, it is possible to reduce the volume of communications traffic between servers required for an equijoin which is performed with data being kept concealed. Specifically, if the numbers of rows of two tables, on which an equijoin is to be performed, are assumed to be m and n, it is possible to reduce the volume of communications traffic necessary for an equijoin to O((m+n)log(m+n)). Moreover, there is no need for the maximum number of overlapping elements of a key attribute to be joined, which was necessary to be known in the existing technique, to be a known number.

Second Embodiment

In the table J which the secure equijoin algorithm of the first embodiment outputs, all the elements of the row, which was not joined, of the table R are $[[0]]$ (0 in the table J (plaintext) of FIG. 4) with the order of the rows of the input table R being maintained. This reveals which row of the input table R was not joined at the time of reconstruction of the table J. To solve this problem, a secure equijoin algorithm of a second embodiment which executes processing to move the joined rows to the upper side of a table after executing the secure equijoin algorithm of the first embodiment will be described.

Input, output, procedures, and processing cost of the secure equijoin algorithm of the second embodiment and a secure equijoin system that implements the secure equijoin algorithm will be described below.

Input

The join-result element sequence $([[e_1]], \ldots, [[e_n]])$ in the secure equijoin algorithm of the first embodiment and the table J, which is the output result thereof, are inputs.

Output

A table J' obtained by rearranging the rows of the table J is output. The table J' is a table in which, of the rows of the table J, a row whose all elements are $[[0]]$ was moved to the lower side.

The table J' is a table having n rows whose i-th row $(1\leq i\leq n)$ is $([[q''_i]], [[v''_{i,\,2}]], \ldots, [[v''_{i,\,a}]], [[u''_{i,\,2}]], \ldots, [[u''_{i,\,b}]])$, where $[[q''_i]]$ is a key attribute value or $[[0]]$, $[[v''_{i,\,2}]], \ldots, [[v''_{i,\,a}]]$ is a row joined from the table L or a−1 $[[0]]$, and $[[u''_{i,\,2}]], \ldots, [[u''_{i,\,b}]]$ is a row joined from the table R or b−1 $[[0]]$ (see FIG. 8).

Procedures

The secure equijoin algorithm of the second embodiment is depicted in FIG. 8.

First, in Step 1, a permutation $<\sigma\sim>$ is generated by performing a stable sort on the join-result element sequence $([[e_1]], \ldots, [[e_n]])$.

The permutation $<\sigma\sim>$ is a permutation that rearranges, if a plaintext element sequence ([1], [0], [1], [1]) of the join-result element sequence $([[e_i]], \ldots, [[e_n]])$ of the first embodiment is used, an element sequence in the following first line into a sequence in the second line.

(First line) ([1], [0], [1], [1])

(Second line) ([1], [1], [1], [0])

In Step 2, the first column $([[q''_1]], \ldots, [[q''_n]])=[[\sigma\sim([[q'_1]], \ldots, [[q'_n]])]]$ of the table J' is generated from the first column $([[q'_1]], \ldots, [[q'_n]])$ of the table J by using the permutation $<\sigma\sim>$.

In Step 4, the j-th column $([[v''_{1,\,j}]], \ldots, [[v''_{n,\,j}]])=[[\sigma\sim([[v'_{1,\,j}]], \ldots, [[v'_{n,\,j}]])]]$ of the table J' is generated from the j-th column $([[v'_{1,\,j}]], \ldots, [[v'_{n,\,j}]])$ of the table J by using the permutation $<\sigma\sim>$ (j=2, . . . , a).

In Step 7, the j-th column $([[u''_{1,\,j-a+1}]], \ldots, [[u''_{n,\,j-a+1}]])=[[\sigma\sim([[u'_{1,\,j-a+1}]], \ldots, [[u'_{n,\,j-a+1}]])]]$ of the table J' is generated from the j-th column $([[u'_{1,\,j-a+1}]], \ldots, [[u'_{n,\,j-a+1}]])$ of the table J by using the permutation $<\sigma\sim>$ (j=a+1, . . . , a+b−1).

By Steps 2, 4, and 7, a row whose all elements are $[[0]]$ is moved to the lower side, and the table J' is output. Therefore, the table J' (plaintext), which is the output result, is like that shown in FIG. 9.

It is to be noted that, if an ascending sort is adopted as the stable sort which is used in Step 1, the rows of the output are turned upside down, which makes it possible to move a row whose all elements are $[[0]]$ to the upper side.

Processing Cost

The communications cost caused by the secure equijoin algorithm of the second embodiment is O(n log(n)) which is necessary for the stable sort.

Secure Equijoin System

Figure 10:
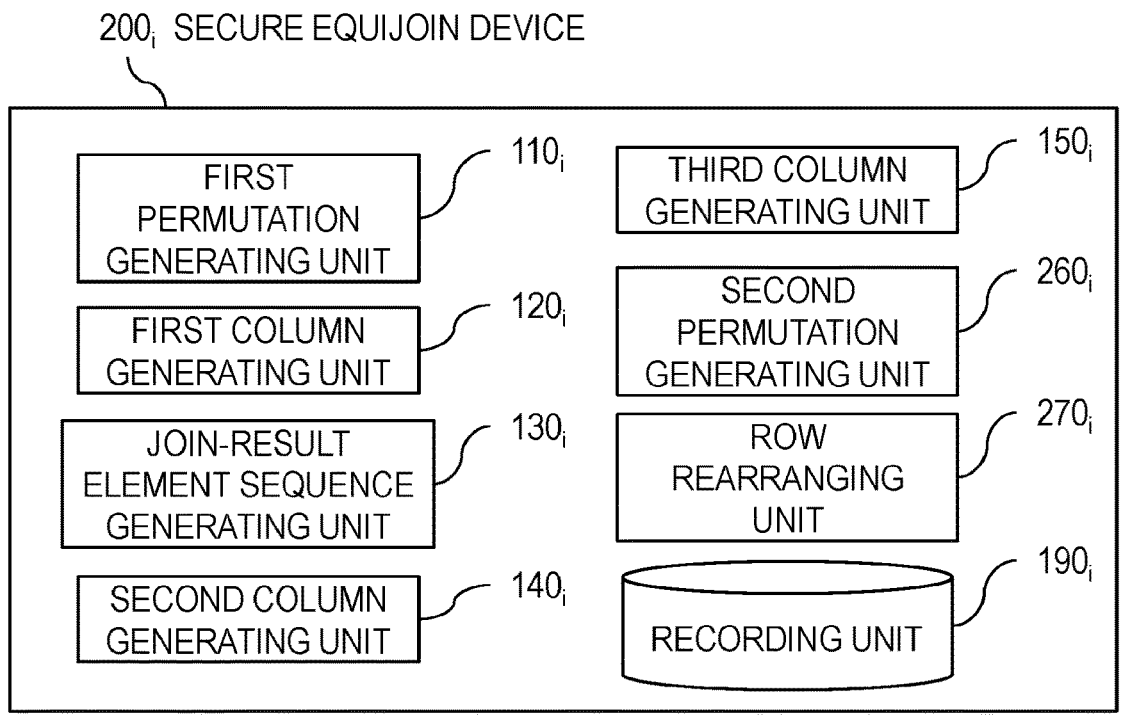
FIG. 10 is a block diagram depicting the configuration of a secure equijoin device $200_i$.
Figure 11:
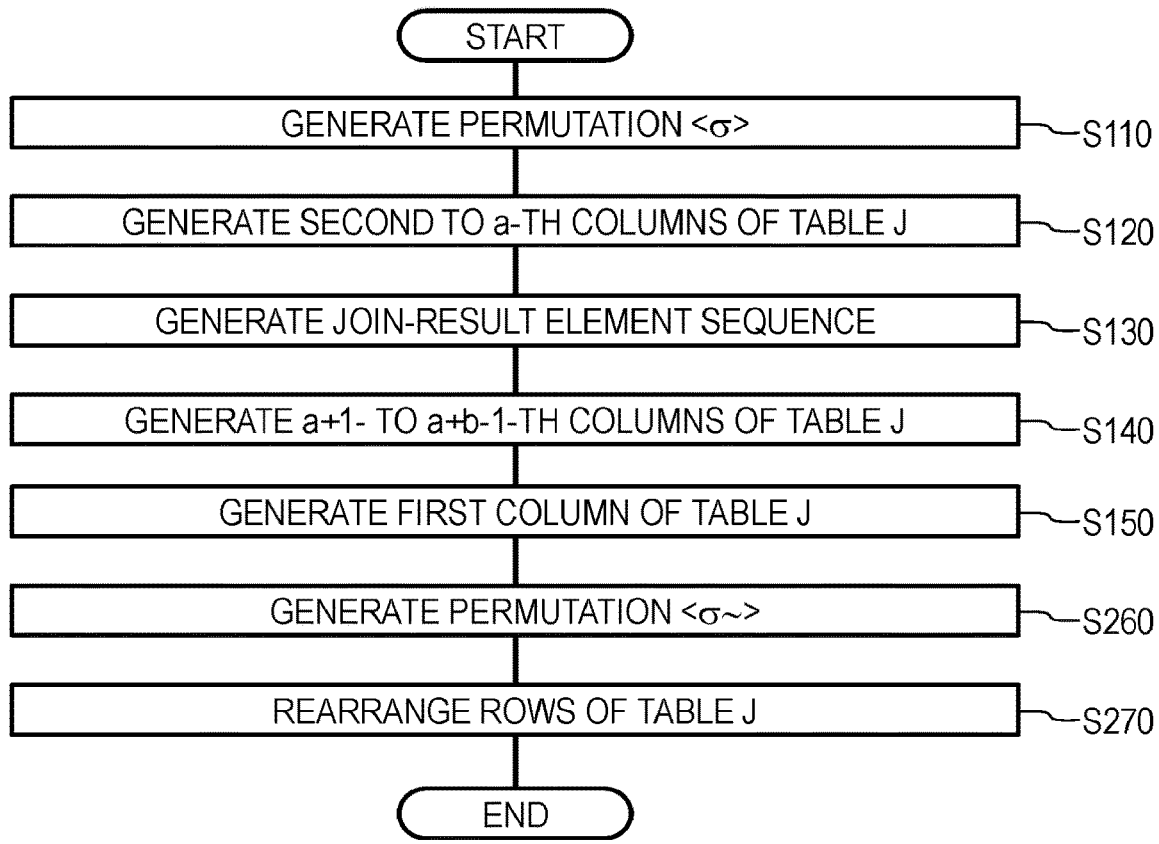
FIG. 11 is a flowchart showing an operation of a secure equijoin system 20.

Hereinafter, a secure equijoin system 20 of the second embodiment will be described with reference to FIGS. 10 and 11. The secure equijoin system 20 differs from the secure equijoin system 10 in that the secure equijoin system 20 includes W secure equijoin devices $200_1, \ldots, 200_W$ instead of including W (W is a predetermined integer greater than or equal to 3) secure equijoin devices $100_1, \ldots, 100_W$. FIG. 10 is a block diagram depicting the configuration of a secure equijoin device $200_i$ ($1 \leq i \leq W$). FIG. 11 is a flowchart showing an operation of the secure equijoin system 20.

As depicted in FIG. 10, the secure equijoin device $200_i$ differs from the secure equijoin device $100_i$ in that the secure equijoin device $200_i$ further includes a second permutation generating unit $260_i$ and a row rearranging unit $270_i$. The second permutation generating unit $260_i$, and the row rearranging unit $270_i$ are also configured so as to be capable of executing, of computations which are required in the secure equijoin algorithm, computations which are required to implement the functions thereof.

A second permutation generating means 260 (which is not depicted in the drawing) of the secure equijoin system 20 is configured with the second permutation generating units $260_1, \ldots, 260_W$, and a row rearranging means 270 (which is not depicted in the drawing) is configured with the row rearranging units $270_1, \ldots, 270_W$.

The secure equijoin system 20 generates the table J' having n rows and a+b−1 columns from the table J having n rows and a+b−1 columns obtained by performing, by using, as input, the table L having m rows and a columns with the elements being concealed and the table R having n rows and b columns with the elements being concealed, a secure equijoin on the table L and the table R. Hereinafter, an operation of the secure equijoin system 20 will be described in accordance with FIG. 11. Since processing from S110 to S150 is similar to that of the secure equijoin system 10, S260 and S270 will be described.

The second permutation generating means 260 generates a permutation $<\sigma\sim>$ by performing a stable sort on the join-result element sequence $([[e_1]], \ldots, [[e_n]])$ (S260). This corresponds to Step 1 of the secure equijoin algorithm of FIG. 8.

The row rearranging means 270 generates the first column $([[q''_1]], \ldots, [[q''_n]]) = [[\sigma\sim([[q'_1]] \ldots, [[q'_n]])]]$ of the table J' from the first column $([[q'_1]], \ldots, [[q'_n]])$ of the table J by using the permutation $<\sigma\sim>$, generates, for $j = 2, \ldots, a$, the j-th column $([[v''_{1,j}]], \ldots, [[v''_{n,j}]]) = [[\sigma\sim([[v'_{1,j}]], \ldots, [[v'_{n,j}]])]]$ of the table J' from the j-th column $([[v'_{1,j}]], \ldots, [[v'_{n,j}]])$ of the table J by using the permutation $<\sigma\sim>$, and generates, for $j = a+1, \ldots, a+b-1$, the j-th column $([[u''_{1,j-a+1}]], \ldots, [[u''_{n,j-a+1}]]) = [[\sigma\sim([[u'_{1,j-a+1}]], \ldots, [[u'_{n,j-a+1}]])]]$ of the table J' from the j-th column $([[u'_{1,j-a+1}]], \ldots, [[u'_{n,j-a+1}]])$ of the table J by using the permutation $<\sigma\sim>$ (S270). This corresponds to Steps 2 to 8 of the secure equijoin algorithm of FIG. 8.

According to the invention of the present embodiment, since the newly required communications cost is O(n log(n)), it can be executed with the volume of communications traffic of O((m+n)log(m+n)) as a whole.

Third Embodiment

The table J' which the secure equijoin algorithm of the second embodiment outputs is a table including a row, which was not joined, as a row whose all elements are [[0]]. When the participants may be informed of the number of joined rows, it may be configured so that only the rows of the table J', which were joined and moved to the upper side, are output. A secure equijoin algorithm of a third embodiment which outputs a table including only the joined rows after the execution of the secure equijoin algorithm of the second embodiment will be described.

Input, output, procedures, and processing cost of the secure equijoin algorithm of the third embodiment and a secure equijoin system that implements the secure equijoin algorithm will be described below.

Input

The join-result element sequence $([[e_1]], \ldots, [[e_n]])$ in the secure equijoin algorithm of the first embodiment and the table J', which is the output result of the secure equijoin algorithm of the second embodiment, are input.

Output

A table obtained by deleting a row, of the rows of the table J', whose all elements are [[0]] from the table J' is a table J'' which is output.

Procedures

The secure equijoin algorithm of the third embodiment is depicted in FIG. 12.

First, in Step 1, to count up the joined rows, the sum [[c]] of the elements of the join-result element sequence $([[e_1]], \ldots, [[e_n]])$ is calculated.

In Step 2, c, which is obtained by reconstructing [[c]] obtained in Step 1, is released and a table J'' obtained by extracting c rows from the top of the table J' is generated.

The table j'', from which a row whose all elements are [[0]] was deleted by Step 2, is output. Therefore, the table J'' (plaintext), which is the output result, is like that shown in FIG. 13.

Processing Cost

The only communications cost caused by the secure equijoin algorithm of the third embodiment is a constant amount O(1) which is necessary to release c one time.

Secure Equijoin System

Figure 15:
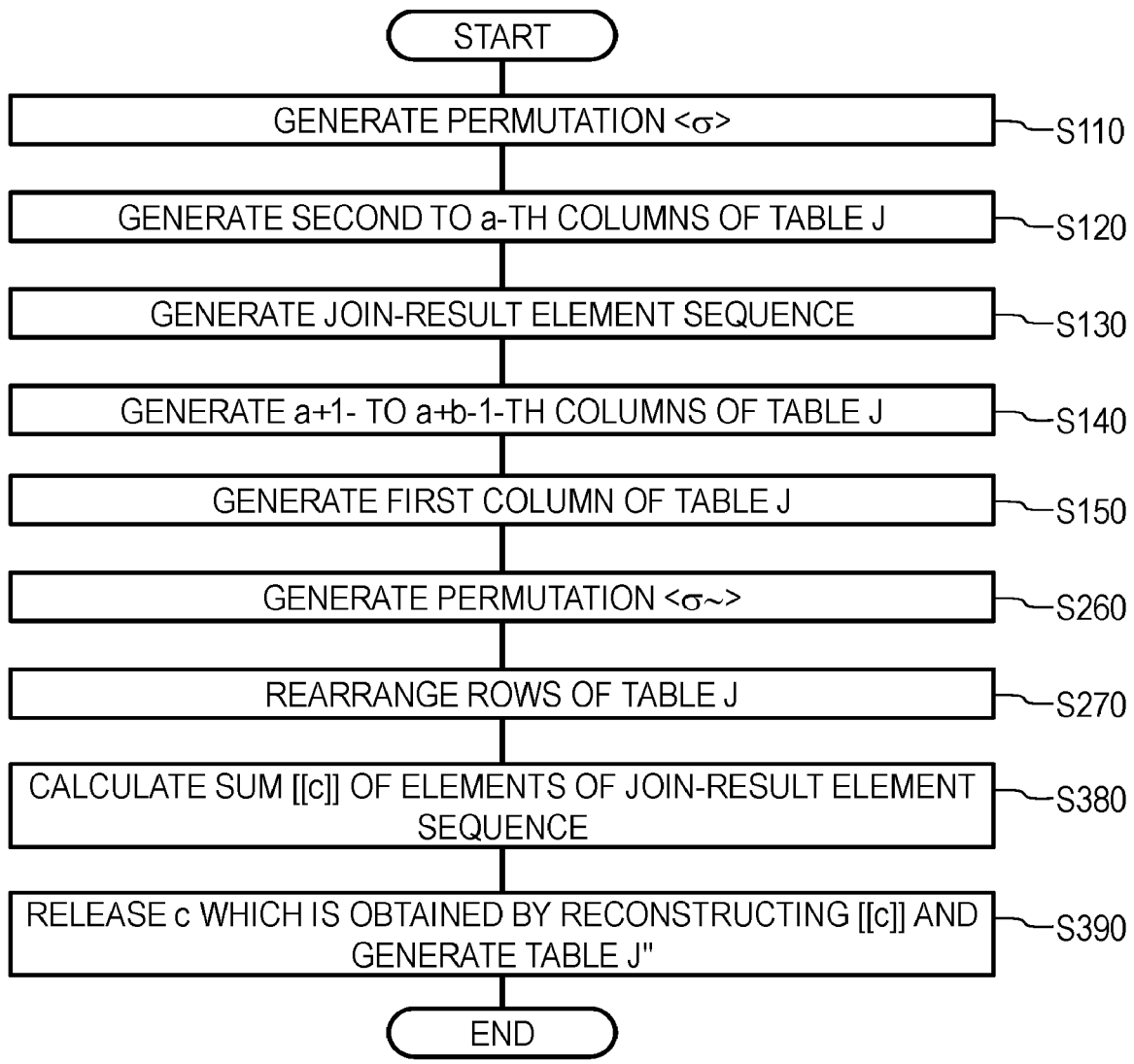
FIG. 15 is a flowchart showing an operation of a secure equijoin system 30.

Hereinafter, a secure equijoin system 30 of the third embodiment will be described with reference to FIGS. 14 and 15. The secure equijoin system 30 differs from the secure equijoin system 20 in that the secure equijoin system 30 includes W secure equijoin devices $300_1, \ldots, 300_W$ instead of including W (W is a predetermined integer greater than or equal to 3) secure equijoin devices $200_1, \ldots, 200_W$. FIG. 14 is a block diagram depicting the configuration of a secure equijoin device $300_i$ ($1 \leq i \leq W$). FIG. 15 is a flowchart showing an operation of the secure equijoin system 30.

As depicted in FIG. 14, the secure equijoin device $300_i$ differs from the secure equijoin device $200_i$ in that the secure equijoin device $300_i$ further includes a number-of-joined-rows calculating unit $380_i$ and a number-of-joined-rows releasing unit $390_i$. The number-of-joined-rows calculating unit $380_i$ and the number-of-joined-rows releasing unit $390_i$ are also configured so as to be capable of executing, of computations which are required in the secure equijoin algorithm, computations which are required to implement the functions thereof.

A number-of-joined-rows calculating means 380 (which is not depicted in the drawing) of the secure equijoin system 30 is configured with the number-of-joined-rows calculating units $380_1, \ldots, 380_W$, and a number-of-joined-rows releasing means 390 (which is not depicted in the drawing) is configured with the number-of-joined-rows releasing units $390_1, \ldots, 390_W$.

The secure equijoin system 30 generates the table J' having n rows and a+b−1 columns from the table J having n rows and a+b−1 columns obtained by performing, by using, as input, the table L having m rows and a columns with the elements being concealed and the table R having n rows and b columns with the elements being concealed, a secure equijoin on the table L and the table R, and generates the table J" having c rows and a+b"1 columns by deleting, from the table J', a row whose all elements are [[0]]. Hereinafter, an operation of the secure equijoin system 30 will be described in accordance with FIG. 15. Since processing from S110 to S270 is similar to that of the secure equijoin system 20, S380 and S390 will be described.

The number-of-joined-rows calculating means 380 calculates the sum [[c]] of the elements of the join-result element sequence ([[$e_1$]], ..., [[$e_n$]]) (S380). This corresponds to Step 1 of the secure equijoin algorithm of FIG. 12.

The number-of-joined-rows releasing means 390 releases c which is obtained by reconstructing [[c]] and generates the table J" obtained by extracting c rows from the top of the table J' (S390). This corresponds to Step 2 of the secure equijoin algorithm of FIG. 12.

According to the invention of the present embodiment, since the newly required communications cost is O(1), it can be executed with the volume of communications traffic of O((m+n)log(m+n)) as a whole.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing functions of the hardware entities described in the embodiments (the devices of the present invention) are to be embodied with a computer, the processing actions of the functions to be provided by the hardware entities are described by a program. By the program then being executed on the computer, the processing functions of the hardware entity are embodied on the computer.

The program describing the processing actions can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing actions may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A secure equijoin system, wherein
$Z_N$ is a finite ring formed of a set of integers from 0 to N (N is an integer greater than or equal to 1), m and n are integers greater than or equal to 1, a and b are integers greater than or equal to 2, and $p_i$ ($1 \leq i \leq m$; $p_1, \ldots, p_m$ differ from each other), $v_{i,j}$ ($1 \leq i \leq m$, $2 \leq j \leq a$), $q_i$ ($1 \leq i \leq n$), and $u_{i,j}$ ($1 \leq i \leq n$, $2 \leq j \leq b$) are elements, which are not 0, of the finite ring $Z_N$,
[[x]] is a value obtained by concealing $x \in Z_N$ and $<\pi>$ is assumed to denote a permutation $\pi$ by secure computation,
the secure equijoin system is configured with three or more secure equijoin devices and generates a table J having n rows and a+b−1 columns from a table L having m rows and a columns with elements being concealed and a table R having n rows and b columns with elements being concealed, and
the secure equijoin system includes
the three or more secure equijoin devices which each have processing circuitry and are configured to cooperatively:
receive, over a network, an input of concealed columns of each of the table L and the table R;
generate a permutation $<\sigma>$ by performing a stable sort on an element sequence ([[$p_1$]], ..., [[$p_m$]], [[$q_1$]], ..., [[$q_n$]], [[$p_1$]], ..., [[$p_m$]]) which is generated from a first column ([[$p_1$]], ..., [[$p_m$]]) of the table L and a first column ([[$q_1$]], ..., [[$q_n$]]) of the table R,
generate second to a-th columns of the table J by generating, for j=2, ..., a,
  (1) an element sequence [[f]]=([[$v_{1,j}$]], ..., [[$v_{m,j}$]], [[0]], ..., [[0]], [[$-v_{1,j}$]], ..., [[$-v_{m,j}$]]) by using a j-th column ([[$v_{1,j}$]], ..., [[$v_{m,j}$]]) of the table L and an element sequence ([[0]], ..., [[0]]) obtained by arranging n, [[0]],
  (2) an element sequence [[g]]=[[$\sigma$([[f]])]] from the element sequence [[f]] by using the permutation $<\sigma>$,
  (3) an element sequence [[g']]=PrefixSum([[g]]) by calculating a prefix sum of the element sequence, [[g]],
  (4) an element sequence [[f']]=[[$\sigma^{-1}$([[g']])]] from the element sequence [[g']] by using an inverse permutation $<\sigma^{-1}>$ of the permutation $<\sigma>$, and
  (5) a j-th column ([[$v'_{1,j}$]], ..., [[$v'_{n,j}$]])=([[$f'_{m+1}$]], ..., [[$f'_{m+n}$]]) of the table J by extracting a partial element sequence ([[$f'_{m+1}$]], ..., [[$f'_{m+n}$]]) of m+1- to m+n-th elements of the element sequence [[f']],
generate
  (1) an element sequence [[f1]]=([[1]], ..., [[1]], [[0]], ..., [[0]], [[−1]], ..., [[−1]]) by using an element sequence ([[1]], ..., [[1]]) of m [[1]] and an element sequence ([[0]], ..., [[0]]) of n, [[0]],
  (2) an element sequence [[g1]]=[[$\sigma$([[f1]])]] from the element sequence [[f1]] by using the permutation $<\sigma>$,
  (3) an element sequence [[g1']]=PrefixSum([[g1]]) by calculating a prefix sum of the element sequence, [[g1]],
  (4) an element sequence [[f1']]=[[$\sigma^{-1}$([[g1']])]] from the element sequence [[g1']] by using the inverse permutation $<\sigma^{-1}>$, and
  (5) a join-result element sequence ([[$e_1$]], ..., [[$e_n$]])=([[$f1'_{m+1}$]], ..., [[$f1'_{m+n}$]]) by extracting a partial element sequence ([[$f1'_{m+1}$]], ..., [[$f1'_{m+n}$]]) of m+1- to m+n-th elements of the element sequence [[f1']],
generate a+1- to a+b−1-th columns of the table J by generating, for j=a+1, ..., a+b−1, a j-th column ([[$u'_{1,j-a+1}$]], ..., [[$u'_{n,j-a+1}$]])=([[$e_1$]]×[[$u_{1,j-a+1}$]], ..., [[$e_n$]]×[[$u_{n,j-a+1}$]]) of the table J by using the join-result element sequence ([[$e_1$]], ..., [[$e_n$]]) and j-a+1-th column ([[$u_{1,j-a+1}$]], ..., [[$u_{m,j-a+1}$]]) of the table R, and
generate a first column ([[$q'_1$]], ..., [[$q'_n$]])=([[$e_1$]]×[[$q_1$]], ..., [[$e_n$]]×[[$q_n$]]) of the table J by using the join-result element sequence ([[$e_1$]], ..., [[$e_n$]]) and the first column ([[$q_1$]], ..., [[$q_n$]]) of the table R,
wherein each of the three or more secure equijoin devices is configured to act upon a divided portion of the concealed columns of the table L and the table R such that each of the entire original text in the columns of the table L and the table R is concealed from each of the secure equijoin devices.

2. The secure equijoin system of claim 1, wherein
the secure equijoin system is configured to generate a table J' having n rows and a+b−1 columns from [[a]] the table L having m rows and a columns with elements being concealed and [[a]] the table R having n rows and b columns with elements being concealed, and
the processing circuitry of the three or more secure equijoin devices is further configured to cooperatively generate a permutation $<\sigma\sim>$ by performing a stable sort on the join-result element sequence ([[$e_1$]], ..., [[$e_n$]]), and
generate a first column ([[$q''_1$]], ..., [[$q''_n$]])=[[$\sigma\sim$([[$q'_1$]], ..., [[$q'_n$]])]] of the table J' from the first column ([[$q'_1$]], ..., [[$q'_n$]]) of the table J by using the permutation $<\sigma\sim>$, generate, for j=2, ..., a, a j-th column ([[$v''_{1,j}$]], ..., [[$v''_{n,j}$]])=[[$\sigma\sim$([[$v'_{1,j}$]], ..., [[$v'_{n,j}$]])]] of the table J' from the j-th column ([[$v'_{1,j}$]], ..., [[$v'_{n,j}$]]) of the table J by using the permutation $<\sigma\sim>$, and generate, for j=a+1, ..., a+b−1, a j-th column ([[$u''_{1,j-z+1}$]], ..., [[$u''_{n,j-z+1}$]])=[[$\sigma\sim$([[$u'_{1,j-z+1}$]], ..., [[$u'_{n,j-z+1}$]])]] of the table J' from the j-th column ([[$u'_{1,j-a+1}$]], ..., [[$u'_{n,j-a+1}$]]) of the table J by using the permutation $<\sigma\sim>$.

3. The secure equijoin system of claim 2, wherein
the secure equijoin system is configured to generate a table J" having c rows and a+b−1 columns from a table L having m rows and a columns with elements being concealed and a table R having n rows and b columns with elements being concealed, and
the processing circuitry of the three or more secure equijoin devices is further configured to cooperatively calculate a sum [[c]] of elements of the join-result element sequence ([[e$_1$]], . . . , [[e$_n$]]), and release the c which is obtained by reconstructing the sum and generate the table J″ obtained by extracting c rows from a top of the table J′.

4. A secure equijoin device in a secure equijoin system in which $Z_N$ is a finite ring formed of a set of integers from 0 to N (N is an integer greater than or equal to 1), m and n are integers greater than or equal to 1, a and b are integers greater than or equal to 2, $p_i$ (1≤i≤m; $p_1$, . . . , $p_m$ differ from each other), $v_{i,j}$ (1≤i≤m, 2≤j≤a), $q_i$ (1≤i≤n), and $u_{i,j}$ (1≤i≤n, 2≤j≤b) are elements, which are not 0, of the finite ring $Z_N$, [[x]] is a value obtained by concealing x∈$Z_N$, <π> is assumed to denote a permutation π by secure computation, and the secure equijoin system is configured with three or more secure equijoin devices and generates a table J having n rows and a+b−1 columns from a table L having m rows and a columns with elements being concealed and a table R having n rows and b columns with elements being concealed, the secure equijoin device comprising:

processing circuitry configured, in cooperation with the other of the three or more secure equijoin devices, to:

receive, over a network, an input of concealed columns of each of the table L and the table R:

generate a permutation <σ> by performing a stable sort on an element sequence ([[p$_1$]], . . . , [[p$_m$]], [[q$_1$]], . . . , [[q$_n$]], [[p$_1$]], . . . , [[p$_m$]]) which is generated from a first column ([[p$_1$]], . . . , [[p$_m$]]) of the table L and a first column ([[q$_1$]], . . . , [[q$_n$]]) of the table R, generate second to a-th columns of the table J by generating, for j=2, . . . , a, (1) an element sequence [[f]]=([[v$_{1,j}$]], . . . , [[v$_{m,j}$]], [[0]], . . . , [[0]], [[−v$_{1,j}$]], . . . , [[−v$_{m,j}$]]) by using a j-th column ([[v$_{1,j}$]], . . . , [[v$_{m,j}$]]) of the table L and an element sequence ([[0]], . . . , [[0]]) obtained by arranging n, [[0]], (2) an element sequence [[g]]=[[σ([[f]])]] from the element sequence [[f]] by using the permutation <σ>, (3) an element sequence [[g′]]=PrefixSum([[g]]) by calculating a prefix sum of the element sequence, [[g]], (4) an element sequence [[f′]]=[[σ$_1$([[g′]])]] from the element sequence [[g′]] by using an inverse permutation <σ$^{-1}$> of the permutation <σ>, and (5) a j-th column ([[v′$_{1,j}$]], . . . , [[v′$_{n,j}$]])= ([[f′$_{m+1}$]], . . . , [[f′$_{m+n}$]]) of the table J by extracting a partial element sequence ([[f′$_{m+1}$]], . . . , [[f′$_{m+n}$]]) of m+1- to m+n-th elements of the element sequence [[f′]], generate (1) an element sequence [[f1]]=([[f]], . . . , [[1]], [[0]], . . . , [[0]], [[−1]], . . . , [[−1]]) by using an element sequence ([[1]], . . . , [[1]]) of m [[1]] and an element sequence ([[0]], . . . , [[0]]) of n, [[0]], (2) an element sequence [[g1]]=[[σ([[f1]])]] from the element sequence [[f1]] by using the permutation <σ>, (3) an element sequence [[g1′]]=PrefixSum([[g1]]) by calculating a prefix sum of the element sequence, [[g1]], (4) an element sequence [[f1′]]=[[σ$^{-1}$([[g1′]])]] from the element sequence [[g1′]] by using the inverse permutation <σ$^{-1}$>, and (5) a join-result element sequence ([[e$_1$]], . . . , [[e$_n$]])= ([[f1′$_{m+1}$]], . . . , [[f1′$_{m+n}$]]) by extracting a partial element sequence ([[f1′$_{m+1}$]], . . . , [[f1′$_{m+n}$]]) of m+1- to m+n-th elements of the element sequence [[f1′]], generate a+1- to a+b−1-th columns of the table J by generating, for j=a+1, . . . , a+b−1, a j-th column ([[u′$_{i,j-a+1}$]], . . . , [[u′$_{n,j-a+1}$]])=([[e$_1$]]×[[u$_{1,j-a+1}$]], . . . , [[e$_n$]]×[[u$_{n,j-a+1}$]]) of the table J by using the join-result element sequence ([[e$_1$]], . . . , [[e$_n$]]) and j-a+1-th column ([[u$_{1,j-a+1}$]], . . . , [[u$_{m,j-a+1}$]]) of the table R, and generate a first column ([[q′$_1$]], . . . , [[q′$_n$]])=([[e$_1$]]× [[q$_1$]], . . . , [[e$_n$]]×[[q$_n$]]) of the table J by using the join-result element sequence ([[e$_1$]], . . . , [[e$_n$]]) and the first column ([[q$_1$]], . . . , [[q$_n$]]) of the table R, wherein each of the three or more secure equijoin devices is configured to act upon a divided portion of the concealed columns of the table L and the table R such that each of the entire original text in the columns of the table L and the table R is concealed from each of the secure equijoin devices.

5. A secure equijoin method, wherein $Z_N$ is a finite ring formed of a set of integers from 0 to N (N is an integer greater than or equal to 1), m and n are integers greater than or equal to 1, a and b are integers greater than or equal to 2, and $p_i$ (1≤i≤m; $p_1$, . . . , $p_m$ differ from each other), $v_{i,j}$ (1≤i≤m, 2≤j≤a), $q_i$ (1≤i≤n), and $u_{i,j}$ (1≤i≤n, 2≤j≤b) are elements, which are not 0, of the finite ring $Z_N$,

[[x]] is a value obtained by concealing x∈$Z_N$ and <π> is assumed to denote a permutation π by secure computation, the secure equijoin method generates, by using a secure equijoin system, a table J having n rows and a+b−1 columns from a table L having m rows and a columns with elements being concealed and a table R having n rows and b columns with elements being concealed, and the secure equijoin method includes three or more secure equijoin devices cooperatively:

receiving, over a network, an input of concealed columns of each of the table L and the table R;

generating a permutation <σ> by performing a stable sort on an element sequence ([[p$_1$]], . . . , [[p$_m$]]), ([[q$_1$]], . . . , [[q$_n$]]), ([[p$_1$]], . . . , [[p$_m$]]) which is generated from a first column ([[p$_1$]], . . . , [[p$_m$]]) of the table L and a first column ([[q$_1$]], . . . , [[q$_n$]]) of the table R, second to a-th columns of the table J by generating, for j=2, . . . , a, (1) an element sequence [[f]]=([[v$_{1,j}$]], . . . , [[v$_{m,j}$]]), ([[0]], . . . , [[0]]), ([[−v$_{1,j}$]], . . . , [[−v$_{m,j}$]]) by using a j-th column ([[v$_{1,j}$]], . . . , [[v$_{m,j}$]]) of the table L and an element sequence ([[0]], . . . , [[0]]) obtained by arranging n, [[0]], (2) an element sequence [[g]]=[[σ([[f]])]] from the element sequence [[f]] by using the permutation <σ>, (3) an element sequence [[g′]]=PrefixSum([[g]]) by calculating a prefix sum of the element sequence [[g]], (4) an element sequence [[f′]]=[[σ$^{-1}$([[g′]])]] from the element sequence [[g′]] by using an inverse permutation <σ$^{-1}$> of the permutation <σ>, and (5) a j-th column ([[v′$_{1,j}$]], . . . , [[v′$_{n,j}$]])= ([[f′$_{m+1}$]], . . . , [[f′$_{m+n}$]]) of the table J by extracting a partial element sequence ([[f′$_{m+1}$]], . . . , [[f′$_{m+n}$]]) of m+1- to m+n-th elements of the element sequence, generating
- (1) an element sequence $[[f]]=([[1]], \ldots, [[1]])$, $([[0]], \ldots, [[0]])$, $([[-1]], \ldots, [[-1]])$ by using an element sequence $([[0]], \ldots, [[0]])$ of n, $[[0]]$,
- (2) an element sequence $[[g1]]=[[\sigma([[f1]])]]$ from the element sequence $[[f1]]$ by using the permutation $<\sigma>$,
- (3) an element sequence $[[g1']]=\text{PrefixSum}([[g1]])$ by calculating a prefix sum of the element sequence $[[g1]]$,
- (4) an element sequence $[[f1']]=[[\sigma^{-1}([[g1']])]]$ from the element sequence $[[g1']]$ by using an inverse permutation $<\sigma^{-1}>$, and
- (5) a join-result element sequence $([[e_1]], \ldots, [[e_n]])=([[f1'_{m+1}]], \ldots, [[f1'_{m+n}]])$ by extracting a partial element sequence $([[f1'_{m+1}]], \ldots, [[f1'_{m+n}]])$ of m+1- to m+n-th elements of the element sequence $[[f1']]$, generating a+1- to a+b−1-th columns of the table J by generating, for j=a+1, ..., a+b−1, a j-th column $([[u'_{1,j-a+1}]], \ldots, [[u'_{n,j-a+1}]])=([[e_1]] \times [[u_{1,j-a+1}]], \ldots, [[e_n]] \times [[u_{n,j-a+1}]])$ of the table J by using the join-result element sequence $([[e_1]] \ldots, [[e_n]]$ and a j−a+1-th column $([[u_{1,j-a+1}]], \ldots, [[u_{m,j-a+1}]]$ of the table R, and generating a first column $([[q'_1]], \ldots, [[q'_n]])=([[e_1]] \times [[q_1]], \ldots, [[e_n]] \times [[q_n]])$ of the table J by using the join-result element sequence $([[e_1]], \ldots, [[e_n]])$ and the first column) $([[q_1]], \ldots, [[q_n]])$ of the table R, wherein each of the three or more secure equijoin devices is configured to act upon a divided portion of the concealed columns of the table L and the table R such that each of the entire original text in the columns of the table L and the table R is concealed from each of the secure equijoin devices.

6. The secure equijoin method of claim 5, wherein
the secure equijoin method includes generating a table J' having n rows and a+b−1 columns from a table L having m rows and a columns with elements being concealed and a table R having n rows and b columns with elements being concealed, and after generating the table J from the table L and the table R, the secure equijoin method includes generating a permutation $<\sigma\sim>$ by performing a stable sort on the join-result element sequence $([[e_1]], \ldots, [[e_n]])$, and generating a first column $([[q''_1]], \ldots, [[q''_n]])=[[\sigma\sim([[q'_1]], \ldots, [[q'_n]])]]$ of the table J' from the first column $([[q'_1]], \ldots, [[q'_n]])$ of the table J by using the permutation $<\sigma\sim>$, generating, for j=2, ..., a, a j-th column $([[v''_{1,j}]], \ldots, [[v''_{n,j}]])=[[\sigma\sim([[v'_{1,j}]], \ldots, [[v'_{n,j}]])]]$ of the table J' from the j-th column $([[v'_{1,j}]], \ldots, [[v'_{n,j}]])$ of the table J by using the permutation $<\sigma\sim>$, and generating, for j=a+1, a+b−1, a j-th column $([[u''_{1,j-a+1}]], \ldots, [[u''_{n,j-a+1}]])=[[\sigma\sim([[u'_{1,j-a+1}]], \ldots, [[u'_{n,j-a+1}]])]]$ of the table J' from the j-th column $([[u'_{1,j-a+1}]], \ldots, [[u'_{n,j-a+1}]])$ of the table J by using the permutation $<\sigma\sim>$.

7. The secure equijoin method of claim 6, wherein
the secure equijoin method includes generating a table J'' having c rows and a+b−1 columns from a table L having m rows and a columns with elements being concealed and a table R having n rows and b columns with elements being concealed, and after generating the table J' from the table L and the table R, the secure equijoin method includes calculating a sum of elements of the join-result element sequence $([[e_1]], \ldots, [[e'_n]])$, and releasing the c which is obtained by reconstructing the sum and generating the table J'' obtained by extracting c rows from a top of the table J'.

8. A non-transitory computer readable medium that stores instructions for causing at least one processor to perform the secure equijoin method of any one of claims 5 to 7.

* * * * *